United States Patent
Li et al.

(10) Patent No.: US 12,333,308 B2
(45) Date of Patent: Jun. 17, 2025

(54) METHOD AND DEVICE FOR SELECTING ENTRY OF QUEUE IN OUT-OF-ORDER PROCESSOR

(71) Applicant: BEIJING VCORE TECHNOLOGY CO., LTD., Beijing (CN)

(72) Inventors: Zusong Li, Beijing (CN); Dandan Huan, Beijing (CN)

(73) Assignee: BEIJING VCORE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/580,047

(22) PCT Filed: Jun. 13, 2023

(86) PCT No.: PCT/CN2023/099985
§ 371 (c)(1),
(2) Date: Jan. 17, 2024

(87) PCT Pub. No.: WO2024/146076
PCT Pub. Date: Jul. 11, 2024

(65) Prior Publication Data
US 2025/0085974 A1    Mar. 13, 2025

(30) Foreign Application Priority Data
Jan. 6, 2023    (CN) ................... 202310017030.2

(51) Int. Cl.
*G06F 9/38* (2018.01)
*G06F 9/30* (2018.01)

(52) U.S. Cl.
CPC ........ *G06F 9/3856* (2023.08); *G06F 9/30036* (2013.01)

(58) Field of Classification Search
CPC .......................... G06F 9/3856; G06F 9/30036
See application file for complete search history.

(56) References Cited

U.S. PATENT DOCUMENTS

| | | | |
|---|---|---|---|
| 9,569,211 B2 * | 2/2017 | Fleischer | G06F 9/3887 |
| 2003/0046520 A1 * | 3/2003 | Dulong | G06F 9/30036 |
| | | | 712/E9.008 |
| 2007/0118720 A1 * | 5/2007 | Espasa | G06F 9/30036 |
| | | | 712/E9.019 |
| 2008/0320274 A1 * | 12/2008 | Singh | G06F 9/3836 |
| | | | 712/E9.086 |
| 2011/0029978 A1 * | 2/2011 | Smolens | G06F 9/5016 |
| | | | 718/103 |

* cited by examiner

*Primary Examiner* — Zachary K Huson
(74) *Attorney, Agent, or Firm* — Hodgson Russ LLP

(57) ABSTRACT

A method for selecting an entry of a queue in an out-of-order processor includes: acquiring a tag value of each entry in the queue; generating a mask bit vector of the queue based on the tag value of each entry; generating an executable bit vector of the queue based on whether a corresponding entry in the queue satisfies an executable condition; generating a selection bit vector of the queue based on the mask bit vector and the executable bit vector; and determining an entry corresponding to a target bit in the selection bit vector as an executable entry, in which the target bit is a first bit in the selection bit vector, and a value of the first bit is equal to a first preset value.

20 Claims, 12 Drawing Sheets

| | entry ID | instruction | valid | rdy | data | TAG | ϙ ϙ |
|---|---|---|---|---|---|---|---|
| 1st entry | 000 | instruction E | 1 | 1 | ϙ ϙ | 1 | ϙ ϙ |
| | 001 | instruction F | 1 | 1 | ϙ ϙ | 1 | ϙ ϙ |
| tail ID → | 010 | | 0 | 0 | ϙ ϙ | 0 | ϙ ϙ |
| | 011 | | 0 | 0 | ϙ ϙ | 0 | ϙ ϙ |
| head ID → | 100 | instruction A | 1 | 1 | ϙ ϙ | 0 | ϙ ϙ |
| | 101 | instruction B | 1 | 1 | ϙ ϙ | 0 | ϙ ϙ |
| | 110 | instruction C | 1 | 0 | ϙ ϙ | 0 | ϙ ϙ |
| last entry | 111 | instruction D | 1 | 1 | ϙ ϙ | 0 | ϙ ϙ |

METHOD AND DEVICE FOR SELECTING ENTRY OF QUEUE IN OUT-OF-ORDER PROCESSOR

CROSS-REFERENCE TO RELATED APPLICATIONS

This application is a national stage entry under 35 U.S.C. § 371 of International Application No. PCT/CN2023/099985, filed on Jun. 13, 2023, which claims priority to Chinese Patent Application No. 202310017030.2, filed on Jan. 6, 2023, the entire disclosures of which are incorporated herein by reference.

TECHNICAL FIELD

The disclosure relates to a field of processor technologies, and in particular to a method and a device for selecting an entry of a queue in an out-of-order processor, an electronic device, a storage medium, a computer program product, and a computer program.

BACKGROUND

When a program is written by a programmer, it is considered that the program is executed in a sequential order, and a following instruction can be executed only when a previous instruction has been executed. Therefore, a processor must ensure such sequential result when the program is executed, otherwise, it is inconsistent with an initial expected behavior of the program. In order to improve the instruction execution efficiency, the existing processors are all out-of-order processors, and instructions in the out-of-order processors are not executed in an order specified by the program. As long as execution conditions are satisfied, the following instruction can be first executed over the previous instruction, so as to improve the instruction execution speed.

An out-of-order queue in the out-of-order processor is used to cache a certain number of instructions and data, be responsible for allocating empty entries for the instructions and data that enters the queue, and selecting instructions and data that satisfy certain conditions from the queue for subsequent execution. The instruction can be a program instruction or an internal operation decoded internally by the processor, where the instruction may be decoded into one or more operations. The hardware processing of selecting entries from the out-of-order queue is more complicated and its timing violation is generally on the critical paths of the processor, which directly affects the frequency of the processor, decreases the performance of the processor, consumes more power and occupies a large chip area.

SUMMARY

According to a first aspect of the disclosure, a method for selecting an entry of a queue in an out-of-order processor is provided. The method includes: acquiring a tag value of each entry in the queue: generating a mask bit vector of the queue based on the tag value of each entry: generating an executable bit vector of the queue based on indication information of each entry in the queue, in which the indication information is configured to indicate whether a corresponding entry satisfies an executable condition: generating a selection bit vector of the queue based on the mask bit vector and the executable bit vector; and determining an entry corresponding to a target bit in the selection bit vector as an executable entry, in which the target bit is a first bit in the selection bit vector, and a value of the first bit is equal to a first preset value.

According to a second aspect of the disclosure, an electronic device is provided, and includes: at least one processor and a memory communicatively connected to the at least one processor. The at least one processor is configured to: acquire a tag value of each entry in the queue; generate a mask bit vector of the queue based on the tag value of each entry: generate an executable bit vector of the queue based on indication information of each entry in the queue, wherein the indication information is configured to indicate whether a corresponding entry satisfies an executable condition: generate a selection bit vector of the queue based on the mask bit vector and the executable bit vector; and determine an entry corresponding to a target bit in the selection bit vector as an executable entry; wherein the target bit is a first bit in the selection bit vector, and a value of the first bit is equal to a first preset value.

According to a third aspect of the disclosure, a non-transitory computer-readable storage medium storing computer instructions is provided. The computer instructions are configured to cause a computer to perform a method for selecting the entry of the queue in the out-of-order processor. The method includes: acquiring a tag value of each entry in the queue: generating a mask bit vector of the queue based on the tag value of each entry: generating an executable bit vector of the queue based on indication information of each entry in the queue, in which the indication information is configured to indicate whether a corresponding entry satisfies an executable condition: generating a selection bit vector of the queue based on the mask bit vector and the executable bit vector; and determining an entry corresponding to a target bit in the selection bit vector as an executable entry, in which the target bit is a first bit in the selection bit vector, and a value of the first bit is equal to a first preset value.

BRIEF DESCRIPTION OF THE DRAWINGS

The above and/or additional aspects and advantages of the present disclosure will become easy to understand from the following description of the embodiments in conjunction with the accompanying drawings.

DETAILED DESCRIPTION

Figure 1:
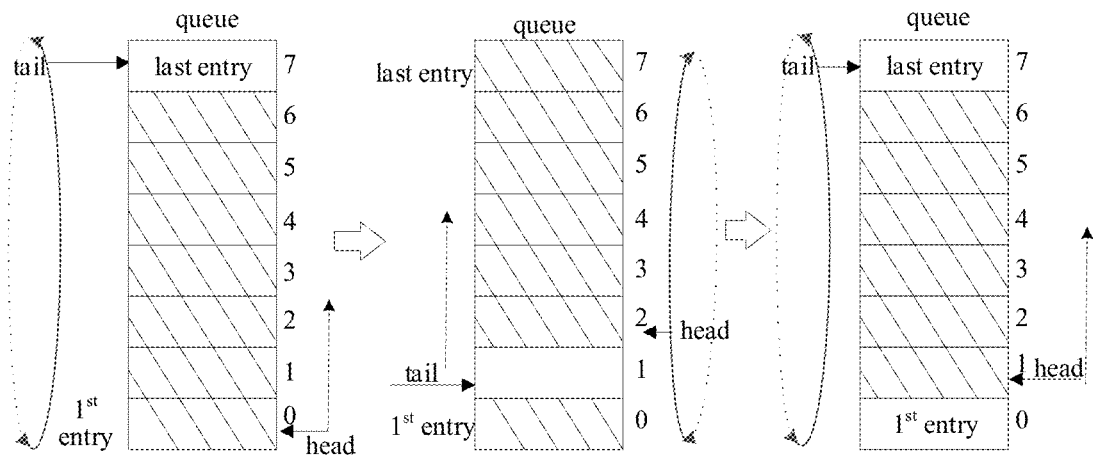
FIG. 1 is a diagram illustrating changes of a first entry, a last entry, a head entry, a tail entry, a head ID and a tail ID of a queue.

Embodiments of the disclosure will be described in detail and examples of embodiments are illustrated in the drawings. The same or similar elements and the elements having the same or similar functions are denoted by same or similar reference numerals throughout the drawings. Embodiments described herein with reference to drawings are exemplary, serve to explain the disclosure, and are not construed to limit the embodiments of the disclosure.

It may be understood that, an out-of-order queue in an out-of-order processor includes a reorder buffer (ROB), a branch queue (BRQ), a fetch target queue (FTQ), an issue queue (IQ), a reservation station, access queues for all levels of caches, a miss status handling register (MSHR), a store buffer, a consistency request queue, etc., The out-of-order queue in the out-of-order processor requires to maintain the order of instructions. When a plurality of instructions are ready in the out-of-order queue (the instructions are "ready", which means that the instructions satisfy an execution condition), the earliest instruction in the program is generally selected for execution. That is, an instruction in the entry is selected for execution by adopting an oldest-first strategy (where the "oldest" instruction refers to the earliest instruction that enters the queue). Thus, the sequential order of the instructions needs to be determined. It is considered that the older the instruction is, the more instructions are depended on it. Therefore, the oldest instruction is first executed, which can effectively improve the degree of parallelism that instructions are executed by the processor. Furthermore, the hardware resources of the processor are occupied by the oldest instruction, including other components such as other out-of-order execution queues. The earlier the old instructions are executed, the earlier the hardware resources can be released for use of the following instructions. Therefore, the oldest instruction needs to be selected from all valid and ready instructions in the out-of-order queue, and an entry where the oldest instruction is located is taken as an executable entry.

The out-of-order queue is generally a circular queue, and the order of instructions is maintained by the head and the tail of the queue. The instruction in a head entry (i.e., an entry where the head of the queue is located) is the oldest instruction in the queue, and the instruction in a previous entry of the tail entry (i.e., an entry where the tail of the queue is located) is the newest instruction in the queue. For instructions entering/caching into the queue, empty entries that the instructions may enter may be allocated from the tail. For selecting valid and ready instructions in the out-of-order queue for execution, when a plurality of valid and ready instructions are to be executed in the out-of-order queue, starting from the head, the oldest instruction is selected among the valid and ready instructions in the out-of-order queue for execution.

In the circular queue, the instructions are written/stored into the queue in an order from a first entry to a last entry and again from the last entry to the first entry. As the instructions are written into the queue, the tail entry may be switched among each entry of the queue, and as the instructions exit the queue, the head entry is switched among each entry of the queue. When a number of times that the head entry is switched from the last entry to the first entry is the same as a number of times that the tail entry is switched from the last entry to the first entry, the head and the tail are on the same "plane": when the number of times that the tail entry is switched from the last entry to the first entry is greater than the number of times that the head entry is switched from the last entry to the first entry, the head and the tail are not on the same "plane".

When the head and the tail are on the same "plane", valid entries (i.e., entries where valid instructions are located) are present from the head to the previous entry of the tail, and executable entries may be selected completely in parallel, since there is no valid entry from the first entry to a previous entry of the head. That is, as long as the first valid and ready entry is selected in parallel from the first entry to the last entry, the oldest instruction among the executable instructions may be selected from the queue. Specifically, a valid and ready bit vector (referred to as a valid ready bit vector for short) with a number of bits being a number of entries (i.e., a number of entries included in the queue) may be generated, and if the first "1" is found from the bit vector, the entry corresponding to the first "1" is an entry where the oldest instruction among the valid and ready instructions is located. It should be noted that. "from an entry a to an entry b" in the embodiments of the present disclosure, includes the entry a, the entry b, and each entry between the entry a and the entry b. Each bit in the valid ready bit vector indicates whether a corresponding entry is valid and ready, and a value of each bit is obtained by performing a bitwise AND operation on a value of the valid bit of the corresponding entry and a value of the ready bit of the corresponding entry.

When the head and the tail are not on the same "plane", valid entries are entries from the head entry to the last entry, and entries from the first entry to the previous entry of the tail entry. Selection of the executable entries are divided into two steps, that is, selection of the executable entries from the head entry to the last entry, and selection of executable entries from the first entry to the previous entry of the tail entry. When no executable entries are selected from the head entry to the tail entry, the executable entries are selected from the first entry to the previous entry of the tail entry. Therefore, the operation of selecting the executable entries cannot be completely performed in parallel, and selections at the two steps must be performed sequentially. Specifically, it needs to generate a valid ready bit vector with a number of bits being a number of entries. The first "1" is found from the bits from a corresponding head entry of the bit vector to the last entry, and when there is no "1" in the bits from the corresponding head entry of the bit vector to the last entry, the first "1" is found from the bits from the corresponding first entry of the bit vector to the previous entry of the tail entry, so that an entry where the oldest instruction among the valid and ready instructions is located can be found, with a large cost and a long delay for selecting the executable entries.

As illustrated in FIG. 1, taking the out-of-order queue including 8 entries for example, in the embodiments of the present disclosure, each entry may be sequentially numbered with an integer between 0 and 7 in an order from the first entry to the last entry, and an ID number corresponding to the entry where the head is located is referred to as an ID number corresponding to the head entry, that is, head ID, and an ID number corresponding to the entry where the tail is located is referred to as an ID number corresponding to the tail entry, that is, tail ID. Reading of the queue means selecting the executable queues starting from the head ID.

In an initialization state, an ID number of the first entry is the minimum, that is, 0), and an ID number of the last entry is the maximum, that is, 7. Instructions are written into the queue from the entry with the ID number being 0, so the smaller the ID number of the entry in the queue, the older the instruction in the entry. Writing of the queue starts from the tail, and exiting of the queue starts from the head. Therefore, the ID number of the entry in the queue for each instruction entering the queue is allocated starting from a tail ID, which is repeatedly 0, 1, 2, 3, 4, 5, 6, 7. Each time the tail ID is flipped (i.e., from 7 to 0), a value of a new tail ID and a value of the head ID are out of order, that is, the value of the new tail ID is smaller than the value of the head ID, and there is a change from the valid instruction being originally located between the head entry and the previous entry of the tail entry, to the valid instruction being located between the head entry and the last entry and between the first entry and the previous entry of the tail entry, wherein the instruction between the head entry and the last entry is older than the instruction between the first entry and the previous entry of the tail entry.

Specifically; the tail ID and the head ID of the queue in a reset state are all 0 (i.e., the initial state). When a new instruction is written into the queue, the tail ID number will be increased. Referring to a left diagram shown in FIG. 1 where 7 instructions have been written into a queue, both the number of times that the head entry is switched from the last entry to the first entry and the number of times that the tail entry is switched from the last entry to the first entry are 0, both a number of flips for the tail ID and a number of flips for the head ID are 0, and the head and the tail are on the same "plane". In the queue at this time, as shown in a shadow portion in the left diagram of FIG. 1, valid instructions are located from the head entry to a previous entry of the tail entry, and an instruction with a smaller ID number is older. In this case, the selection of the executable entries may be completely performed in parallel.

As time goes on, as shown in a middle diagram of FIG. 1, two instructions exit the head in the queue and another two instructions enter the queue on the basis of the left diagram of FIG. 1. At this time, the tail ID is flipped and is changed to 1, while the head ID is not flipped and is changed to 2. As shown in a shadow portion in the middle diagram of FIG. 1, the valid instructions are located from the head entry to the last entry and from the first entry to the previous entry of the tail entry, and the instructions with smaller ID numbers are no longer older. The order of old instructions is an order from the head entry to the last entry and from the first entry to the previous entry of the tail entry. In this case, the selection of the executable entries is not completely performed in parallel, but must be performed in a sequential order, i.e., the executable entries are first selected from the head entry to the last entry, and if no executable entries are selected, the executable entries are then selected from the first entry to the previous entry of the tail entry.

As time goes on, as shown in a right diagram of FIG. 1, another 7 instructions exit the tail entry, and another 6 instructions are written into the queue at the same time on the basis of the middle diagram of FIG. 1. In this case, the tail ID is changed to 7, and the head ID is flipped and is changed to 1. At this time, both the number of times that the head entry is switched from the last entry to the first entry and the number of times that the tail entry is switched from the last entry to the first entry are 1, both a number of flips for the tail ID number and a number of flips for the head ID number are 1, and the head and the tail are on the same "plane". In the queue at this time, as shown in a shadow portion in the right diagram of FIG. 1, valid instructions are located from the head entry to the previous entry of the tail entry, and an instruction with a smaller ID number is older. In this case, the selection of the executable entries may be completely performed in parallel.

Since there is a case that the head and the tail are not on the same "plane" as shown in the middle diagram of FIG. 1, the selection of the entry in the out-of-order processor cannot be completely performed in parallel, which leads to a delay, directly affects the performance of the processor, consumes more power and occupies a large area. A method for selecting an entry of a queue in an out-of-order processor with a low delay, low power and occupying a small area is urgently needed, so that the executable entries may be selected in parallel from the out-of-order queue completely and efficiently.

A method and an apparatus for selecting an entry of a queue in an out-of-order processor, an electronic device, a storage medium, a computer program product, and a computer program are provided in the embodiments of the disclosure, which may reduce a selection logic for selecting executable entries from the queue, reduce the complexity of selection, thereby reducing the selection delay, effectively enhancing the performance of the out-of-order processor, reducing power consumption and saving the area.

The method and the apparatus for selecting an entry of a queue in an out-of-order processor, the electronic device, the storage medium, the computer program product, and the computer program according to the embodiments of the disclosure are described referring to attached drawings.

It needs to be noted that, the embodiments of the disclosure are described by taking the out-of-order queue including N entries, and each entry being sequentially numbered with an integer between 0 and N-1 for example. The instructions may be written into the queue from a 0th entry (i.e., an entry with an ID number being 0) to an (N-1)th entry (i.e., an entry with an ID number being N-1), or may be written into the queue from the (N-1)th entry to the 0th entry. That is, each entry may be sequentially numbered with an integer between 0 and N-1 in an order from the first entry to the last entry, or sequentially numbered with an integer between 0 and N-1 in an order from the last entry to the first entry, which is not limited in the present disclosure. The embodiment of the present disclosure is described by taking an instruction being written into a queue from the 0th entry to the (N-1)th entry, i.e., each queue entry being sequentially numbered with an integer between 0 and N-1 in the order from the first entry to the last entry for example.

In an initialization state, the queue is empty, and the head ID is same as the tail ID, i.e., 0.

When the instructions are continuously written into the queue from the tail, and a position of each instruction to be written in the queue is allocated starting from the tail. When the queue is not full, the tail ID is the ID of the first empty entry to be written at next time. When the queue is full, the tail ID and the head ID are same.

The oldest entry in the out-of-order processor is a head entry, and the oldest entry refers to an entry where the oldest instruction is located. For selecting the valid and ready instructions in the queue for execution, when a plurality of valid and ready instructions are to be executed in the out-of-order queue, starting from the head, the oldest instruction is selected from the valid and ready instructions in the queue for execution. When the instruction in the head entry exits, the head ID is switched to an ID number of the next oldest entry.

In the reset state, the head ID and the tail ID are set to be the same, that is, an ID number of a reset entry, and the reset entry is any entry of the queue. When the reset entry is 0, it is in the initialization state. When the head ID and the tail ID are reset, valid fields of all the entries in the queue are set to be invalid.

When a new instruction enters the queue, relevant information of the instruction may be written into each corresponding field of the entry where the instruction is located, and a valid bit field of the entry where the instruction is located is set to be valid. In this case, the tail ID is switched to an ID number of a next entry into which another instruction is to be written.

The method for selecting an entry of a queue in an out-of-order processor according to the embodiments of the disclosure is described referring to attached drawings.

Figure 2:
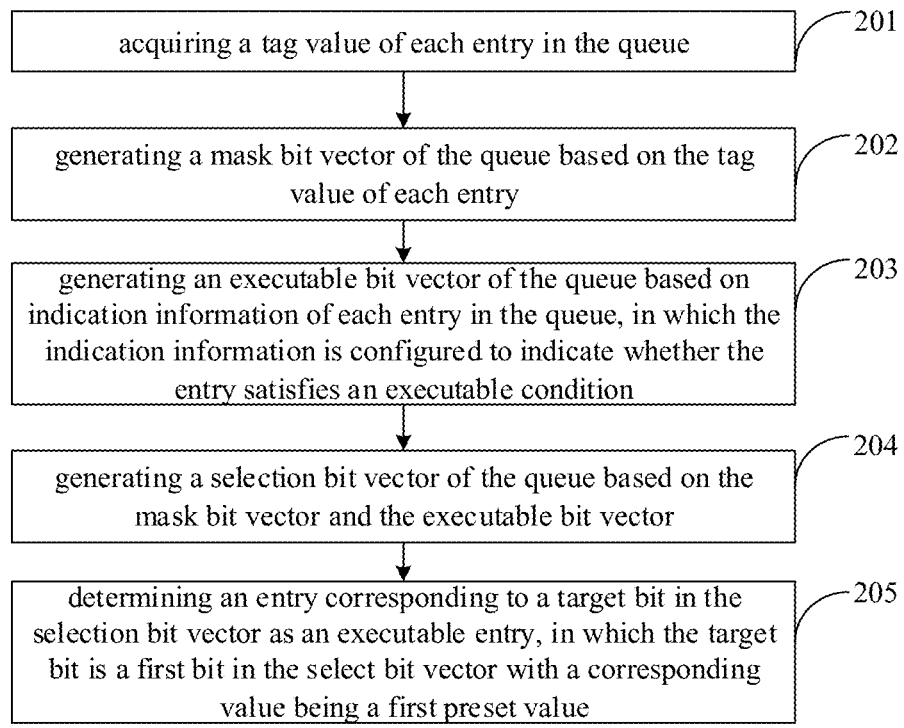
FIG. 2 is a flowchart illustrating a method for selecting an entry of a queue in an out-of-order processor according to an embodiment of the disclosure.

FIG. 2 is a flowchart illustrating a method for selecting an entry of a queue in an out-of-order processor according to an embodiment of the disclosure.

As illustrated in FIG. 2, the method for selecting the entry of the queue in the out-of-order processor includes the following steps.

At step 201, a tag value of each entry in the queue is acquired.

The queue is an out-of-order queue in an out-of-order processor.

In embodiments of the disclosure, a tag field of the entry may be added in the queue, and a tag value of each entry in the queue is stored in the tag field. The tag value of each entry is a preset first tag value or a preset second tag value.

The preset first tag value and the preset second tag value may be 1-bit binary values, and the preset first tag value is opposite to the preset second tag value. That is, the preset first tag value may be 0 or 1, and the preset second tag value may be 0 or 1. When the preset first tag value is 0, the preset second tag value is 1, and when the preset first tag value is 1, the preset second tag value is 0.

In the embodiments of the disclosure, when a new instruction enters the queue, relevant information of the instruction may be written into each corresponding field of the queue entry where the instruction is located, a valid bit field of the entry where the instruction is located is set to be valid, and the corresponding tag value may be written into the tag field of the entry. In this case, the tail ID of the queue is switched to an ID number of the next entry into which another instruction is to be written.

In an initialization state, the tag value of each entry in the queue is set to the preset first tag value.

When instructions are written into the queue from the 0th entry to the (N-1)th entry, the head ID and the tail ID are switched to respective IDs of respective next entries in a direction where the ID number increases (namely 0 to N-1), and the instruction in the direction where the ID number increases is newer. Before the tail ID or the head ID is switched to N-1, a tag value of a tail entry (which can be understood as an entry that an instruction enters by allocation from the tail) the preset first tag value: when the tail ID or the head ID is switched to N-1, a next ID number of the tail ID or a next ID number of the head ID is encoded starting from 0, and after the tail ID is switched to N-1, starting from the next entry of the tail entry (namely, the tail ID is 0)), the tag value of the tail entering entry is flipped from the preset first tag value to the preset second tag value, for example, flipped from 0 to 1.

When the instructions are written into the queue from the (N-1)th entry to the 0th entry, the head ID and the tail ID are switched to respective IDs of respective next entries in a direction where the ID number decreases (namely N-1 to ( ), and the instruction in the direction where the ID number decreases is newer. Before the tail ID or the head ID is switched to 0, the tag value of the tail entering entry is the preset first tag value: when the tail ID or the head ID is switched to 0), a next ID number of the tail ID or a next ID number of the head ID is encoded starting from N-1, and after the tail ID is switched to 0, starting from the next entry of the tail entry (namely, the tail ID is N-1), the tag value of the tail entering entry is flipped from the first tag value to the second tag value, for example, flipped from 0 to 1.

At step 202, the mask bit vector of the queue is generated based on the tag value of each entry.

The mask bit vector is a vector including some binary bits, and the number of bits of the mask bit vector is the number N of entries in the queue.

At step 203, an executable bit vector of the queue is generated based on indication information of each entry in the queue. The indication information is configured to indicate whether the entry satisfies an executable condition.

Each entry has corresponding indication information that may indicate whether the entry satisfies the executable condition. The indication information of each entry may include first indication information for indicating whether an instruction in the entry is valid, and second indication information for indicating whether a state of the entry satisfies the executable condition. When the first indication information indicates that the instruction in the entry is valid, and the second indication information indicates that the state of the entry satisfies the executable condition, the entry satisfies the executable condition.

The first indication information of each entry may be a value of a valid bit of the entry, or other information for indicating whether an instruction in the entry is valid, which is not limited in the disclosure. The second indication information of each entry may be a value of a ready bit of the entry, or a value of a ready field of an instruction in the entry, or other information for indicating a state of the entry satisfies the executable condition, which is not limited in the disclosure. The value of the valid bit of a certain entry may be obtained by determining whether the instruction in the entry is valid. The value of the ready bit of the certain entry may be obtained by determining whether the state of the entry satisfies the executable condition.

As a possible implementation, when the first indication information of each entry is a value of the valid bit of the entry, and the second indication information is a value of the ready bit of the entry, an executable bit vector of the queue may be generated based on the value of the valid bit and the value of the ready bit of each entry in the queue.

As another possible implementation, when the first indication information of each entry is a value of the valid bit of the entry, and the second indication information is a value of the ready field of the instruction in the entry, an executable bit vector of the queue may be generated based on the value of the valid bit of each entry in the queue and the value of the ready field of each instruction in the queue.

The executable bit vector is a vector including some binary bits, and the number of bits of the executable bit vector is M, which is greater than the number N of entries in the queue. The value of each bit in the executable bit vector may indicate whether the entry corresponding to the bit satisfies the executable condition.

Specifically, in response to N being a power of 2, M is twice N: in response to N being not the power of 2, M is twice X. X is a power of 2 greater than N and closest to N.

For example, when N=8, M is twice N, that is, M=16; when N=6, M is twice X. X is a power of 2 greater than N and closest to N, that is, X=8, and correspondingly, M=8*2=16.

At step 204, a selection bit vector of the queue is generated based on the mask bit vector and the executable bit vector.

The selection bit vector is a vector including some binary bits, and the number of bits of the selection bit vector and the number of bits of the executable bit vector are the same, that is, M.

At step 205, an entry corresponding to a target bit in the selection bit vector is determined as an executable entry. The target bit is a first bit in the selection bit vector with a corresponding value being a first preset value.

The first preset value may be 1.

In the embodiments of the disclosure, a first target bit with a corresponding value being 1 may be determined from the selection bit vector in the order of entry IDs from low to high, and the entry corresponding to the target bit may be taken as an executable entry.

Further, when a plurality of executable entries need to be selected from the queue, after step 205 is executed, the determined executable entry may be set as not satisfying the executable condition, for example, the value of the valid bit of the determined executable entry is set to be invalid. Then, the method skips to step 203, and a next executable entry is determined by repeatedly executing the steps 203 to 205, until the number of all the determined executable entries reaches a target number. The target number is a number of the plurality of executable entries that need to be selected from the queue.

Therefore, the executable entries may be selected from the queue in parallel, thereby reducing a selection logic when the executable entries are selected from the queue, and reducing the complexity of selection.

In the embodiments of the present disclosure, after all the executable entries in the queue are determined based on the selection bit vector, an instruction in each of the executable entries may exit from the queue, and a valid bit field of the entry where the exited instruction is located is set to be invalid, that is, 0, and the head ID is updated. When the entry where the exited instruction is located is the head entry, the head entry is switched to a next oldest entry, and the head ID is updated to an ID number of the next oldest entry. When the entry where the exited instruction is located is not the head entry, the head entry and the head ID remain unchanged. After the head moves to such entry later and the instruction in such entry exits the queue, the head may move to the next entry with the oldest instruction.

In summary, according to the method for selecting the entry of the queue in the out-of-order processor in the embodiments of the disclosure, the tag value of each entry in the queue is acquired: the mask bit vector of the queue is generated based on the tag value of each entry: the executable bit vector of the queue is generated based on the indication information of each entry in the queue, in which the indication information is configured to indicate whether the entry satisfies an executable condition: the selection bit vector of the queue is generated based on the mask bit vector and the executable bit vector; and the entry corresponding to the target bit in the selection bit vector is determined as the executable entry, in which the target bit is the first bit in the selection bit vector with the corresponding value being the first preset value. In this way, the method may reduce the selection logic for selecting the executable entry from the queue, reduce the complexity of selection, thereby reducing the delay of selection, effectively enhancing the performance of the out-of-order processor, reducing the power consumption and saving the area.

Figure 3:
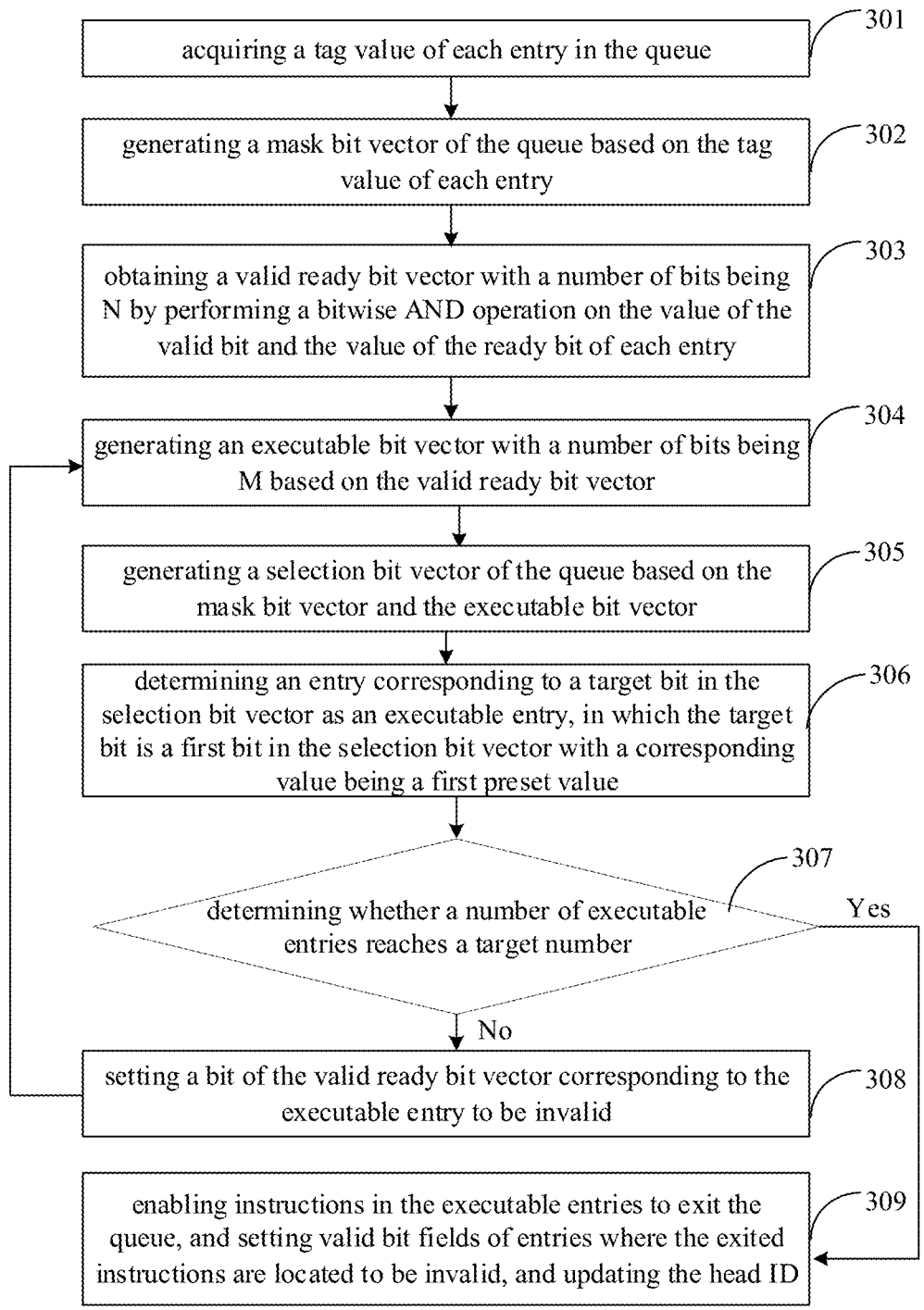
FIG. 3 is a flowchart illustrating a method for selecting an entry of a queue in an out-of-order processor according to another embodiment of the disclosure.

In combination with FIG. 3, the method for selecting an entry of a queue in an out-of-order processor according to the embodiment of the disclosure is further described.

FIG. 3 is a flowchart illustrating another method for selecting an entry of a queue in an out-of-order processor according to an embodiment of the disclosure.

As illustrated in FIG. 3, the method for selecting the entry of the queue in the out-of-order processor includes the following steps.

At step 301, a tag value of each entry in the queue is acquired.

Each entry has its corresponding ID, and the embodiments of the disclosure are illustrated by taking the ID of each entry from the first entry to the last entry being an integer between 0 and N-1 for example. N is a number of entries in the queue. N may be a power of 2, or N may not be a power of 2, which is not limited in the disclosure.

It may be understood that, a tail entry is switched among the entries as instructions are written into the queue. When the tail entry is switched from the last entry to the first entry, an ID number corresponding to the tail entry is flipped, that is, flipped from N-1 to 0.

As an possible implementation, the tag value of each entry in the queue is determined by: in an initialization state, determining the tag value of each entry as a preset first tag value: after the instructions are written into the queue, determining a number of flips for the ID number corresponding to the tail entry; and determining the tag value of each entry in the queue based on the number of flips.

In response to the number of flips being 0, the tag value of each entry in the queue is determined as the preset first tag value: in response to the number of flips being an odd number, a tag value of a target entry in the queue is determined as a preset second tag value; and in response to the number of flips being other even numbers than 0), the tag value of the target entry in the queue is determined as the preset first tag value: the target entry includes the first entry and each entry between the first entry and the tail entry.

In addition, in response to the number of flips being 0, the tag value of other entry in the queue than the target entry may be determined as the preset first tag value; and in response to the number of flips being other even number than 0, the tag value of the other entry than the target entry may be determined as the preset second tag value.

The method for determining the tag value in each queue in the embodiments of the disclosure is illustrated by taking N=8 (i.e., N being the power of 2), and N=6 (i.e., N being not the power of 2) for example, respectively. It is illustrated by taking each entry from the first entry to the last entry of the queue being sequentially numbered in a binary form of 0 to 7 or 0 to 5, the first tag value being 0 and the second tag value being 1 for example. The dashed boxes in FIG. 5-13 represent entries where valid instructions in the queue are located.

Figure 4:
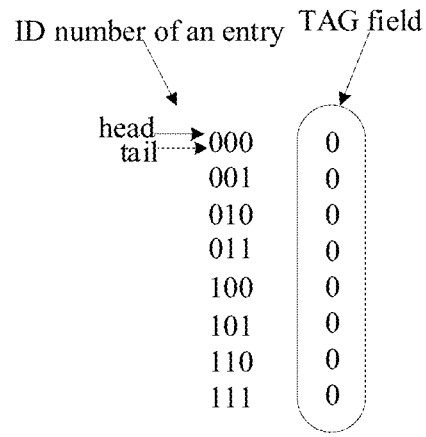
FIG. 4 is a diagram illustrating a queue in a reset state according to an embodiment of the disclosure.

Referring to FIG. 4, when N=8, the tail ID and the head ID of the queue are both 0 in the reset state (i.e., the initial state), and the tag value of each entry in the queue is the first tag value 0.

When a new instruction is written into the queue, the tail ID may increase, and after the instruction in the head entry exits the queue, the head ID may increase.

Figure 5:
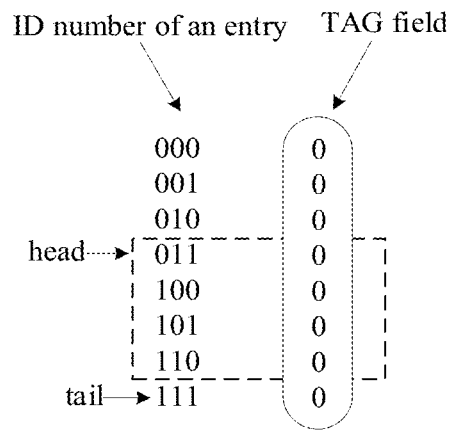
FIG. 5 is a diagram illustrating a queue when a head ID and a tail ID are not flipped according to an embodiment of the disclosure.

After instructions are written in the queue and instructions exit the queue, when the tail ID and the head ID are not flipped, i.e., their numbers of flips are 0), the valid instructions are located between the head entry to the previous entry of the tail entry, and the tag value of each entry is the first tag value 0. As shown in FIG. 5, after the instructions are written into the queue and the instructions exit the queue, for example, 7 instructions enter the queue and 3 instructions exit the queue, the tail ID is changed to 111, and the head ID is changed to 011. In this case, both the tail ID and the head ID are not flipped. The instructions between the head entry and the previous entry of the tail entry are valid, as shown in the dashed box of FIG. 5. The tail ID is not flipped, the tag value of the tag field for each entry where each instruction entering the queue by allocation of the tail ID is located and the tag value of the tag field in the head entry are the first tag values 0.

Figure 6:
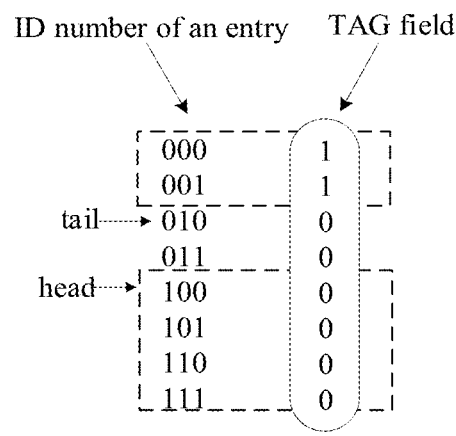
FIG. 6 is a diagram illustrating a queue when a tail ID is flipped and a head ID is not flipped according to an embodiment of the disclosure.

Further, after the instructions are written into the queue and the head instruction exits the queue, the tail ID is flipped once and the head ID is not flipped, the tag value of each entry (i.e., the target entry) where each instruction is written after the tail ID is flipped is the second tag value 1, the tag value of other entry than the target entry is the first label value 0), and the tag value of the head entry is the first label value 0. As shown in FIG. 6, after the instructions are written into the queue and the head instruction exits the queue, for example, after 1 instruction exits the queue and 3 instructions enter the queue, the head ID is changed from 011 to 100, the tail ID has reached the ID number 111, flipped and changed to 010. In this case, the tail ID is flipped once, and the head ID is not flipped. After the tail ID is flipped, the tag value of the tag field of each entry where each instruction is are written starting from the ID number 000 is set to be the second label value 1. That is, for two entries with the entry ID numbers being 000 and 001, the tag values in the tag fields are changed from the first tag value 0 to the second tag value 1. The head ID has not been flipped, and the tag value in the tag field of the head entry is the first tag value 0.

Figure 7:
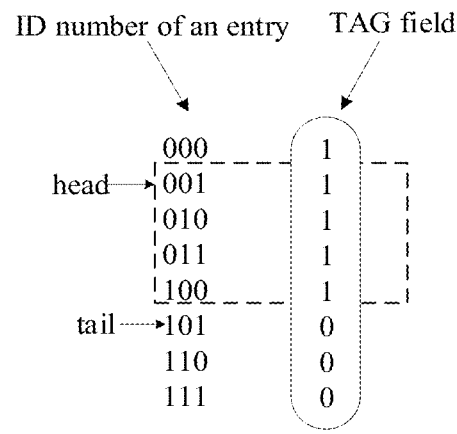
FIG. 7 is a diagram illustrating a queue after a head ID and a tail ID are flipped according to an embodiment of the disclosure.

Further, after the instructions are written into the queue and the head instruction exits the queue, when both the tail ID and the head ID are flipped once, the tag value of each entry (i.e., the target entry) where each instruction is written after the tail ID is flipped is the second tag value 1, the tag value of other entry than the target entry is the first label value 0, and the tag value of the head entry is the first label value 1. As shown in FIG. 7, after the instructions are written into the queue and the head instruction exits the queue, for example, after 5 instructions exit the queue and 3 instructions enter the queue, the head ID has reached the ID number 111 and flipped. That is, the head ID is flipped and changed from 100 to 001, and the tail ID is changed from 010 to 101. Since the tail ID has been flipped once, tag values of the entries where instructions are written after the tail ID is flipped are all 1, that is, tag values of entries (i.e., entries with ID numbers of 010, 011 and 100) where 3 instructions just entering the queue are located, are all set to the second tag value 1. In this case, the head ID also has been flipped, and the tag value of the head entry is also the second tag value 1.

Figure 8:
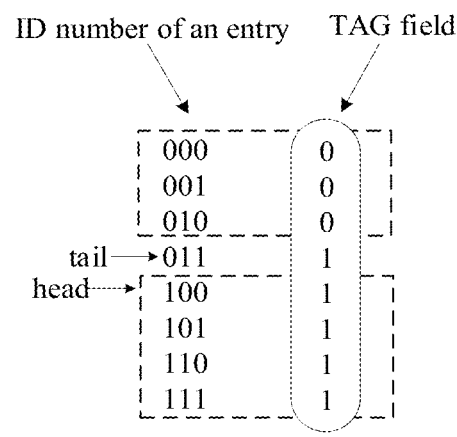
FIG. 8 is a diagram illustrating a queue when a tail ID has been flipped again and a head ID has not flipped again according to an embodiment of the disclosure.

Further, after the instructions are written into the queue and the head instruction exits the queue, the tail ID has been flipped again (i.e., has been flipped twice), and the head ID has not been flipped again (i.e., has been flipped once), the tag value of each entry (i.e., the target entry) where the each instruction is written after the tail ID is flipped is the first tag value 0, the tag value of other entry than the target entry is the second label value 1, and the tag value of the head entry is the second label value 1. As shown in FIG. 8, after the instructions are written into the queue and the head instructions exit the queue, for example, after 6 instructions enter the queue and 3 instructions exit the queue, the tail ID has reached the ID number 111 again and has been flipped, and the head ID has not been flipped again. That is, the tail ID is flipped and changed from 101 to 011, and the head ID is changed from 001 to 100. Since the tail ID has been flipped again, and the number of flips 2 is an even number, the tag value of the tag field of each entry where the instructions are written starting from the ID number 000 after the tail ID is flipped is set to be the first label value 0. That is, tag values of the tag fields of three entries with ID numbers of 000, 110 and 111 are set to the second tag values 1, and tag values of the tag fields of the three entries with the ID numbers of 000, 001 and 010 are changed from the second tag value 1 to the first tag value 0. The head ID has not been flipped again, and the tag value of the tag field of the head entry is the second tag value 1.

Further, after the instructions are written into the queue and the head instruction exits the queue, both the tail ID and the head ID are flipped again (i.e., flipped twice), the tag value of each entry (i.e., the target entry) where each instruction is written after the tail ID is flipped is the first tag value 0, the tag value of other entry than the target entry is the second label value 1, and the tag value of the head entry is the second label value 0.

Figure 9:
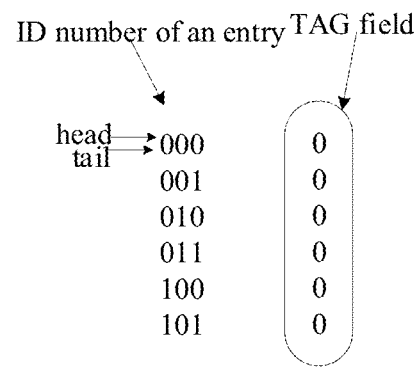
FIG. 9 is a diagram illustrating another queue in a reset state according to an embodiment of the disclosure.

Referring to FIG. 9, when N=6, the tail ID and the head ID of the queue are both 0 in the reset state (i.e., the initial state), and the tag value of each entry is the first tag value 0.

When a new instruction is written into the queue, the tail ID number may increase, and after the instruction in the head entry exits the queue, the head ID may increase.

Figure 10:
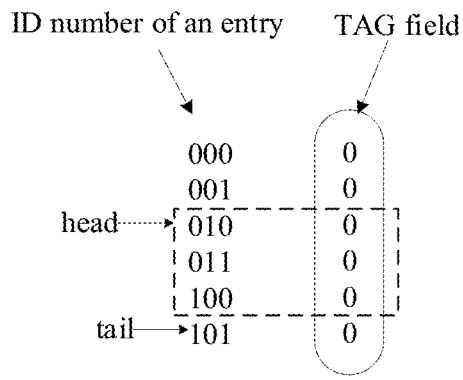
FIG. 10 is a diagram illustrating another queue when a head ID and a tail ID are not flipped according to an embodiment of the disclosure.

After the instructions are written into the queue and instructions exit the queue, when the tail ID and the head ID are not flipped, i.e., their numbers of flips are 0, the valid instructions are located between the head entry to the previous entry of the tail entry, and the tag value of each entry is the first tag value 0. As shown in FIG. 10, after the instructions are written into the queue and the head instructions exit the queue, for example, after 5 instructions enter the queue and 2 instructions exit the queue, the head ID is changed from 000 to 010, and the tail ID is changed from 000 to 101. In this case, the tail ID and the head ID are not flipped. The instructions between the head entry and the previous entry of the tail entry are valid, as shown in the dashed box of FIG. 10. The tail ID is not flipped, the tag value of the tag field for each entry where each instruction entering the queue by allocation of the tail ID is located and the tag value of the tag field in the head entry are the first tag values 0.

Figure 11:
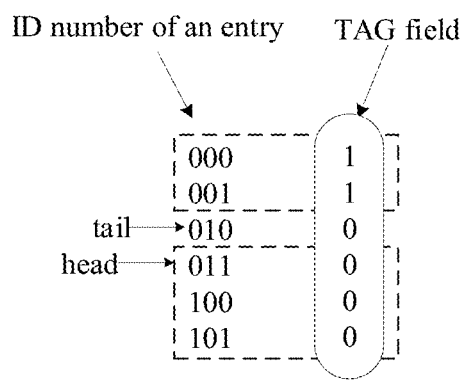
FIG. 11 is a diagram illustrating another queue when a tail ID is flipped and a head ID is not flipped according to an embodiment of the disclosure.

Further, after the instructions are written into the queue and the head instruction exits the queue, the tail ID is flipped once and the head ID is not flipped, the tag value of each entry (i.e., the target entry) where each instruction is written after the tail ID is flipped is the second tag value 1, the tag value of other entry than the target entry is the first label value 0, and the tag value of the head entry is the first label value 0. As shown in FIG. 11, after the instructions are written into the queue and the head instruction exits the queue, for example, after 3 instructions enter the queue and 1 instruction exits the queue, the head ID is changed from 010 to 011, the tail ID has reached the ID number 111 from the ID number 101, flipped and changed to 010. In this case, the tail ID is flipped once, and the head ID is not flipped. After the tail ID is flipped, the tag value of the tag field of each entry where each instruction is written starting from the ID number 000 is set to be the second label value 1. That is, for two entries with the ID numbers of 000 and 001, the tag values in the tag fields are changed from the first tag value 0 to the second tag value 1. The head ID has not been flipped, and the tag value in the tag field of the head entry is the first tag value 0.

Figure 12:
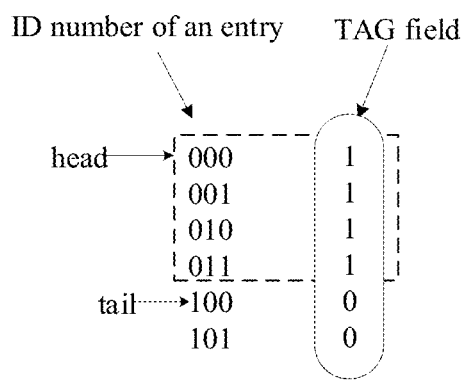
FIG. 12 is a diagram illustrating another queue after a head ID and a tail ID are flipped according to an embodiment of the disclosure.

Further, after the instructions are written into the queue and the head instruction exits the queue, when the tail ID and the head ID are flipped once, the tag value of each entry (i.e., the target entry) where each instruction is written after the tail ID is flipped is the second tag value 1, the tag value of other entry than the target entry is the first label value 0), and the tag value of the head entry is the first label value 1. As shown in FIG. 12, after the instructions are written into the queue and the head instructions exit the queue, for example, after 2 instructions enter the queue and 3 instructions exit the queue, the head ID has reached the ID number 111 and flipped. That is, the head ID is flipped and changed from 011 to 000, and the tail ID is changed from 010 to 100. Since the tail ID has been flipped once, tag values of the entries where the instructions are written after the tail ID is flipped are all 1, that is, tag values of entries (i.e., entries with two ID numbers of 010 and 011) where 2 instructions just entering the queue are all set to the second tag value 1. In this case, the head ID also has been flipped, and the tag value of the head entry is also the second tag value 1.

Figures 13, 14:
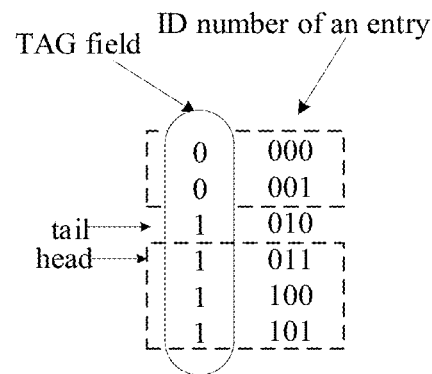
FIG. 13 is a diagram illustrating another queue when a tail ID has flipped again and a head ID has not been flipped again according to an embodiment of the disclosure.
FIG. 14 is a diagram illustrating a queue according to an embodiment of the disclosure.

Further, after the instructions are written into the queue and the head instruction exits the queue, the tail ID has been flipped again (i.e., has been flipped twice), and the head ID has not been flipped again (i.e., has been flipped once), the tag value of each entry (i.e., the target entry) where each instruction is written after the tail ID is flipped is the first tag value 0 the tag value of other entry than the target entry is the second label value 1, and the tag value of the head entry is the second label value 1. As shown in FIG. 13, after the instructions are written into the queue and the head instruction exits the queue, for example, after 4 instructions enter the queue and 3 instructions exit the queue, the tail ID has reached the ID number 111 again and has been flipped, and the head ID has not been flipped again. That is, the head ID is flipped and changed from 100 to 010, and the head ID is changed from 000 to 011. Since the tail ID number has been flipped again, and the number of flips 2 is an even number, the tag value of the tag field of each entry where each instruction is written starting from the ID number 000 after the tail ID is flipped is set to be the first label value 0. That is, tag values of the tag fields of two entries with ID numbers of 100 and 101 are set to the second tag values 1, and the tag values of the tag fields of the two entries with the ID numbers of 000 and 001 are changed from the second tag value 1 to the first tag value 0. The head ID has not been flipped again, and the tag value of the tag field of the head entry is the second tag value 1.

Further, after the instructions are written into the queue and the head instruction exits the queue, the tail ID and the head ID has been flipped again (i.e., has been flipped twice), the tag value of each entry (i.e., the target entry) where each instruction is written after the tail ID is flipped is the first tag value 0, the tag value of other entry than the target entry is the second label value 1, and the tag value of the head entry is the second label value 0.

At step 302, the mask bit vector of the queue is generated based on the tag value of each entry.

A number of bits of the mask bit vector is N.

As a possible implementation, the step 302 may be implemented by: determining a tag value of a head entry in each entry: obtaining a processed tag value of each entry by performing an exclusive-OR (XOR) processing on the tag value of each entry and the tag value of the head entry; and generating the mask bit vector of the queue based on the processed tag value of each entry.

As shown in the following equation, the XOR processing may be performed on the tag value of each entry of the queue (i.e., one from the first entry to the last entry) and the tag value of the head entry, to obtain the mask bit vector with the bit number being N.

$$\text{mask\_vec}[N-1:0] = TAG[N-1:0]\ XOR\ \{N'b\{TAG[\text{Head id}]\}\}$$

mask_vec [N-1:0] represents values of a 0th bit to an (N-1)th bit of the mask bit vector: TAG [N-1:0] represents tag values of tag fields for the 0th entry to the (N-1)th entry: b{TAG [Head id]} represents a tag value of a tag field of the head entry: N' represents the number N: "XOR" represents the XOR operation.

In the embodiments of the disclosure, taking indication information including first indication information and second indication information for example, the first indication information is used to indicate whether an instruction in the entry is valid and the second indication information is used to indicate whether a state of the entry satisfies an execution condition, and in response to the first indication information indicating the instruction in the entry is valid and the second indication information indicating the state of the entry satisfies the execution condition, the entry satisfies the executable condition. The first indication information is a value of a valid bit of the entry and the second indication information includes a value of a ready bit of the entry. An executable bit vector of the queue may be generated based on the value of the valid bit and the value of the ready bit of each entry in the queue in the following manner as shown in steps 303 to 304.

At step 303, a valid ready bit vector with a number of bits being N is obtained by performing a bitwise AND operation on the value of the valid bit and the value of the ready bit of each entry; and The value of the ready bit of a certain entry may be obtained by determining whether the state of the entry satisfies the executable condition; and the value of the valid bit of the certain entry may be obtained by determining whether the instruction in the entry is valid.

As shown in the following equation, the valid ready bit vector with the number of bits being N may be obtained by performing a bitwise AND operation on the value of the valid bit and the value of the ready bit of each entry in the queue.

$$\text{valid\_rdy\_vec}[N-1:0] = \text{valid}[N-1:0] \& \text{rdy}[N-1:0]$$

valid_rdy_vec [N-1:0] represents values of the 0th bit to the (N-1)th bit of the valid ready bit vector: valid [N-1:0] represents values of valid bits of the 0th entry to the (N-1)th entry: rdy [N-1:0] represents values of the ready bits of the 0th entry to the (N-1)th entry; and "&" represents the AND operation.

It needs to be noted that, the embodiment is illustrated by there being a valid bit and a ready bit in the queue for example. When there is no valid bit and no ready bit in the queue, a valid ready bit vector with N bits may be generated based on other forms of first indication information and second indication information of each entry in the queue. For example, the valid ready bit vector with the number of bits being N may be obtained by performing the AND operation on the value of the valid bit in each entry and the value of the ready bit in a corresponding instruction.

At step 304, an executable bit vector with a number of bits being M is generated based on the valid ready bit vector.

In response to N being a power of 2, M is twice N: in response to N being not the power of 2, M is twice X. X is a power of 2 greater than N and closest to N.

As a possible implementation, the step 304 may be implemented by: obtaining the executable bit vector by taking values of the bits of the valid ready bit vector as values of a 0th bit to an (N-1)th bit of the executable bit vector and values of an (M/2)th bit to an (M/2+N-1)th bit of the executable bit vector, respectively: in response to the N being not the power of 2, values of other bits of the executable bit vector than the 0th bit to the (N-1)th bit and the (M/2)th bit to the (M/2+N-1)th bit are second preset values.

The second preset value may be 0.

Specifically, when N is a power of 2, values of the 0th bit to the (N-1)th bit of the executable bit vector, are values of the first entry to the last entry corresponding to the valid ready bit vector of the queue: values of the Nth bit to the (2N-1)th bit of the executable bit vector, are obtained by duplicating the values of the first entry to the last entry corresponding to the valid ready bit vector.

When N is not a power of 2, values of the 0th bit to the (N-1)th bit of the executable bit vector, are values of the first entry to the last entry corresponding to the valid ready bit vector of the queue: values of the (M/2)th bit to the (M/2+N-1)th bit of the executable bit vector, are obtained by duplicating the values of the first entry to the last entry corresponding to the valid ready bit vector, and values of other bits of the executable bit vector are 0.

That is, step 304 may be implemented by:

$$\text{exc\_vec}[N-1:0] = \text{valid\_rdy\_vec}[N-1:0]$$
$$\text{exc\_vec}[M/2+N-1:M/2] = \text{valid\_rdy\_vec}[N-1:0]$$
$$\text{exc\_vec}[M/2-1:N] = \{(M/2-N)'b\{0\}\}$$
$$\text{exc\_vec}[M-1:M/2+N] = \{(M/2-N)'b\{0\}\}$$

where exc_vec [N-1:0] represents the values of the 0th bit to the (N-1)th bit of the executable bit vector: exc_vec [M/2+N-1: M/2] represents the values of the (M/2)th bit to the (M/2+N-1)th bit of the executable bit vector: exc_vec [M/2-1: N] represents the values of the Nth bit to the (M/2-1)th bit of the executable bit vector: exc_vec [M-1: M/2+N] represents the values of the (M-1)th bit to the (M/2+N)th bit of the executable bit vector: b {0} represents the second preset value: (M/2-N)' means the number M/2-N.

At step 305, a selection bit vector of the queue is generated based on the mask bit vector and the executable bit vector.

As a possible implementation, the step 305 may be implemented by:

performing a bitwise NOT operation on the mask bit vector, and performing a bitwise AND operation on values of a 0th bit to an (N-1)th bit after the bitwise NOT operation and values of a 0th bit to an (N-1)th bit of the executable bit vector, and taking values of N bits after the bitwise AND operation, as values of a 0th bit to an (N-1)th bit of the selection bit vector; taking values of an Nth bit to an (M-1)th bit of the executable bit vector as values of an Nth bit to an (M-1)th bit of the selection bit vector; and generating the selection bit vector based on the values of the 0th bit to the (N-1)th bit of the selection bit vector and the values of the Nth bit to the (M-1)th bit of the selection bit vector.

That is, the step 305 may be implemented by:

$$\text{select\_vec}[N-1:0] = \text{exc\_vec}[N-1:0] \& \sim \text{mask\_vec}[N-1:0]$$
$$\text{select\_vec}[M-1:N] = \text{exc\_vec}[M-1:N]$$

where select_vec [N-1:0] represents the values of the 0th bit to the (N-1)th bit of the selection bit vector: select_vec [M-1: N] represents the values of the Nth bit to the (M-1)th bit of the selection bit vector: exc_vec [M-1: N] represents the values of the Nth bit to the (M-1)th bit of the executable bit vector; and "~" represents the NOT operation.

At step 306, an entry corresponding to a target bit in the selection bit vector is determined as an executable entry. The target bit is a first bit in the selection bit vector with a corresponding value being a first preset value.

The first preset value may be 1.

As a possible implementation, the entry corresponding to the target bit in the selection bit vector may be determined as the executable entry by: obtaining a target code by performing a position coding on the target bit: obtaining a processed code by deleting a value of a highest bit in the target code; and taking the processed code as an executable entry ID number, and determining an entry corresponding to the executable entry ID number as the executable entry.

The executable entry ID number is an ID number corresponding to the executable entry.

At step 307, it is determined whether a number of executable entries reaches a target number: if so, step 309 is executed, and if not, step 308 is executed.

The target number is a number of a plurality of executable entries that need to be selected from the queue, and the target number may be 1 or greater than 1, which is not limited in the disclosure.

At step 308, bits of the valid ready bit vector corresponding to the executable entries are set to be invalid. Then, the method skips to the step 304 of generating the executable bit vector with the number of bits being M based on the valid ready bit vector.

At step 309, instructions in the executable entries are enabled to exit the queue, and valid bit fields of entries where the exited instructions are located are set to be invalid, and a head ID is updated.

It may be understood that, when the target number is greater than 1, the number of the executable entries does not reach the target number after the step 306 is executed once. In this case, after the step 306 is executed, the bits of the valid ready bit vector corresponding to the executable entries may be set to be invalid. Then, the method skips to the step 304, and the next executable entry is determined by repeatedly executing the steps 304 to 306, until the number of all the determined executable entries reaches the target number, and the instructions in the executable entries exit the queue, and the valid bit fields of entries where the exited instructions are located are set to be invalid (that is, 0), and the head ID is updated.

The process of selecting the executable entries from the queue in the embodiments of the disclosure is illustrated by taking N=8 (i.e., N being the power of 2), and N=6 (i.e., N being not the power of 2) for example, respectively. It is illustrated by taking the first entry to the last entry of the queue being sequentially numbered in a binary form of 0 to 7 or 0 to 5, the first tag value being 0 and the second tag value being 1 for example.

Each entry of the queue includes information fields used by instructions, such as a valid field, ardy field, and a data field. The valid field stores a value of a valid bit of an entry, and records whether the entry is valid. For example, it is defined in the embodiments of the disclosure that valid field being 1 means that the corresponding entry is valid, and valid field being 0 means that the corresponding entry is invalid. The rdy field stores a value of a ready bit of the entry, and records whether instructions and data in the entry are ready. For example, it is defined in the embodiments of the disclosure that the rdy field being 1 means that the corresponding instructions and data in the entry are ready, i.e., reaching an executable state, and the rdy field being 0) means that the corresponding instructions and data in the entry are not ready. The data field records information such as commands and data used for the instruction in the corresponding entry. When an executable entry in the queue is selected for execution, the oldest instruction is selected from the valid and ready instructions in the queue for execution. In addition, values of bits of each bit vector are represented in an order of entry IDs from high to low in the embodiments of the disclosure.

Referring to FIG. 14, for an out-of-order queue where N=8, M is 16. A tag field is added for each entry in the 8-entries queue, to store a tag value of each entry in the queue. In the embodiment, tag values of entries numbered 100, 101, 110, and 111 that instructions A, B, C, D have entered respectively, and tag values of entries numbered 010 and 011 that the instructions have not entered are 0, the tail ID has been flipped from 111 to 000, and tag values of entries numbered 000 and 001 that instructions E and F have entered respectively, are changed from 0 to 1. That is, the tag values of entries are {00000011}.

Figure 15:
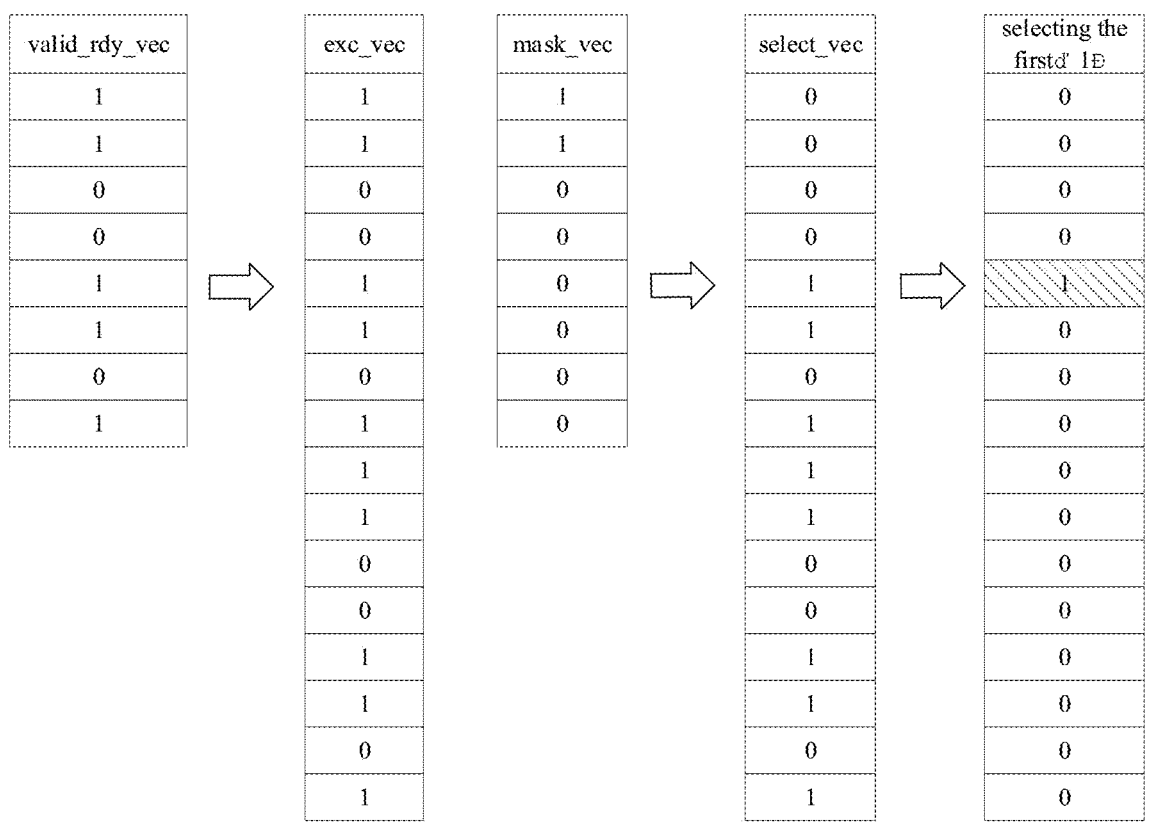
FIG. 15 is a diagram illustrating a plurality of bit vectors according to an embodiment of the disclosure.

Referring to FIG. 15, in the embodiments of the disclosure, an 8-bits mask bit vector "mask_vec" of the queue is generated based on the tag value of each entry. Specifically, the XOR processing may be performed on the tag values {00000011} of entries from the first entry to the last entry and the tag value 0 of the entry with the head ID being 100, to obtain the 8-bits mask_vec.

$$\text{mask\_vec}[7:0] = TAG[7:0] \; XOR\{8'b\{TAG[100]\}\} =$$
$$\{00000011\} \; XOR \; \{00000000\} = \{00000011\}$$

Moreover, an 8-bits valid ready vector "valid_rdy_vec" may be generated based on the value of the valid bit and the value of the ready bit of each entry. The value of each bit in the valid ready bit vector indicates whether each entry of the queue is valid and ready, and the value of each entry of valid_rdy_vec is equal to the value after the AND operation on the corresponding valid bit value and the corresponding ready bit value. Since the instructions A, B, C, D, E, F in the queue are all in the valid state, that is, the valid bits of the entries where the instructions are located are all 1, the valid bit vector from the first entry (the 0th entry) to the last entry (the 7th entry) is {11110011} (values of the bits of the bit vector are represented in the order of entry IDs from high to low). The instruction with the ready bit being 1 indicate that the instruction is ready, that is, the instructions A, B, D, E, F are in the ready and executable state, and the ready bit vector from the first entry (the 0th entry) to the last entry (the 7th entry) is {10110011} (values of the bits of the bit vector are represented in the order of entry IDs from high to low), the valid ready bit vector is obtained by performing the bitwise AND operation on the valid bit vector and the ready bit vector as shown in the following equation:

$$\text{valid\_rdy\_vec}[7:0] =$$
$$\text{valid}[7:0] \; \& \; \text{rdy}\,[7:0] = \{11110011\} \; \& \; \{10110011\} = \{10110011\}.$$

Further, an M-bits executable bit vector "exc_vec" of the queue may be generated based on the valid ready bit vector. Since N is 8, which is a power of 2, M is twice N (that is, M is 16). Specifically, according to the following equations, the values exc_vec [7:0] from the 0th bit to the 7th bit of the exc_vec are equal to the values {10110011} from the 0th bit to the 7th bit of the valid_rdy_vec of the queue, and the values exc_vec [15:8] from the 8th bit to the 15th bit of the exc_vec are equal to the values obtained by duplicating {10110011} from the 0th bit to the 7th bit of the valid_rdy_vec of the queue. That is, the values exc_vec [15:0] from the 0th bit to the 15th bit of the exc_vec of the queue are {1011001110110011}.

$$\text{exc\_vec}[7:0] = \text{valid\_rdy\_vec}[7:0] = \{10110011\}$$
$$\text{exc\_vec}[15:8] = \{10110011\}$$

That is, exc_vec [15:0]={1011001110110011}

Further, a select_vec with M bits (i.e., 16 bits) of the queue may be generated based on the mask bit vector and the executable bit vector. Specifically, according to the following equations, the values select_vec [7:0] from the 0th bit to the 7th bit of the select_vec are equal to the values obtained by performing the bitwise AND operation on the values exc_vec [7:0] from the 0th bit to the 7th bit of the exc_vec and the values after the bitwise NOT operation on the 8-bits mask_vec from the 0th bit to the 7th bit, and the values select_vec [15:8] from the 8th bit to the 15th bit of the select_vec are equal to the values obtained by duplicating the values exc_vec [15:8] from the 8th bit to the 15th bit of the exc_vec. In this way, the 16-bits selection bit vector is obtained.

$$\text{select\_vec}[7:0] = \text{exc\_vec}[7:0] \,\&\sim \text{mask\_vec}[7:0] =$$
$$\{10110011\} \,\&\sim \{00000011\} = \{10110011\} \,\&\, \{11111100\} = \{10110000\}$$
$$\text{select\_vec}[15:8] = \text{exc\_vec}[15:8] = \{10110011\}$$

That is, select_vec [15:0]={1011001110110000}

Further, referring to the shadow portion of FIG. 15, the first 1 may be selected from the select_vec {1011001110110000} in an order of entry IDs from low to high, and the bit where the first "1" is located is a target bit. A target code 0100 may be obtained by encoding a position of the first "1" in the selection bit vector, and a processed code 100 may be obtained by deleting the value 0 of the 1-bit highest bit in the target code 0100. The processed code 100 is an ID number (i.e., an executable entry ID number) of an entry where the oldest instruction among the valid and ready instructions selected from the queue is located. That is, an entry corresponding to the entry ID number 100 is an executable entry. Further, the oldest instruction (i.e., the instruction A) in the entry with the entry ID number 100 among the valid and ready instructions is obtained by entry selection for execution.

Figures 16, 17:
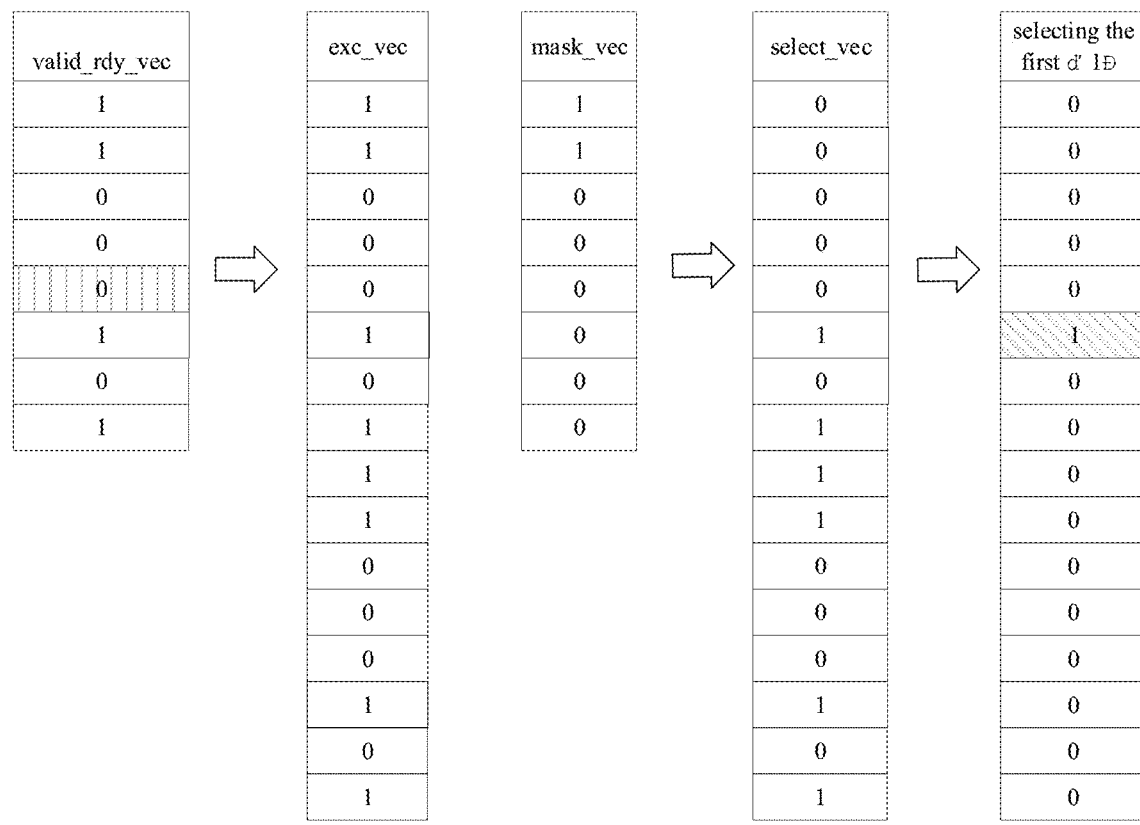
FIG. 16 is another diagram illustrating a plurality of bit vectors according to an embodiment of the disclosure.
FIG. 17 is a diagram illustrating a queue after a plurality of instructions are selected and
    executed according to an embodiment of the disclosure.

Taking the target number being 2 for example, referring to the shadow portion in FIG. 16, the bit for the instruction that has been selected from the valid_rdy_vec may be further set to be invalid. That is, the bit of the valid_rdy_vec corresponding to the entry numbered 100 is set to be invalid (that is, set to 0), so as to obtain an updatedvalid_rdy_vec, which is equal to {10100011}.

Further, referring to FIG. 16, an M-bits executable bit vector of the queue may be generated again based on the updated valid ready bit vector. According to the following equations, the values exc_vec [7:0] from the 0th bit to the 7th bit of the exc_vec are equal to the values {10100011} from the 0th bit to the 7th bit of the valid_rdy_vec of the queue, and the values exc_vec [15:8] from the 8th bit to the 15th bit of the exc_vec are equal to the values obtained by duplicating {10100011} from the 0th bit to the 7th bit corresponding to the valid_rdy_vec of the queue. That is, the values exc_vec [15:0] from the 0th bit to the 15th bit of the exc_vec of the queue are {1010001110100011}.

$$\text{exc\_vec}[7:0] = \text{valid\_rdy\_vec}[7:0] = \{10100011\}$$
$$\text{exc\_vec}[15:8] = \{10100011\}$$

That is, exc_vec [15:0]={1010001110100011}

Further, a select_vec with M bits (i.e., 16 bits) of the queue may be generated based on the mask bit vector and the executable bit vector. Specifically, according to the following equations, the values select_vec [7:0] from the 0th bit to the 7th bit of the select_vec are equal to the values obtained by performing the bitwise AND operation on the values exc_vec [7:0] from the 0th bit to the 7th bit of the exc_vec and the values after the bitwise NOT operation on the 8-bits mask_vec from the 0th bit to the 7th bit, and the values select_vec [15:8] from the 8th bit to the 15th bit of the select_vec are equal to the values obtained by duplicating the values exc_vec [15:8] from the 8th bit to the 15th bit of the exc_vec. In this way, the 16-bits selection bit vector is obtained.

$$\text{select\_vec}[7:0] = \text{exc\_vec}[7:0] \,\&\sim \text{mask\_vec}[7:0] =$$
$$\{10100011\} \,\&\sim \{00000011\} = \{10100011\} \,\&\, \{11111100\} = \{10100000\}$$
$$\text{select\_vec}[15:8] = \text{exc\_vec}[15:8] = \{10100011\}$$

That is, select_vec [15:0]={1010001110100000}

Further, referring to a shadow portion in FIG. 16, the first "1" may be selected from the select_vec {1010001110100000} in an order of entry IDs from low to high, and the bit where the first "1" is located is a target bit, a target code 0101 may be obtained by encoding a position of the first "1" in the selection bit vector, and a processed code 101 may be obtained by deleting the value 0 of the 1-bit highest bit in the target code 0101. The processed code 101 is an ID number (i.e., an executable entry ID number) of an entry where the oldest instruction among the valid and ready instructions selected from the queue. That is, an entry corresponding to the entry ID number 101 is an executable entry. Further, the oldest instruction (i.e., the instruction B) in the entry with the entry ID number 101 among the valid and ready instructions is obtained by entry selection for execution.

In summary: two executable instructions may be selected in parallel, which are the instruction A in the entry with the ID number 100 and the instruction B in the entry with the ID number 101, respectively. After the two execution instructions exit the queue, the head ID may be changed to 110, and valid bit fields of the entries where the instruction A and the instruction B are located are set to 0, thereby obtaining a queue as shown in FIG. 17.

Figures 18, 19:
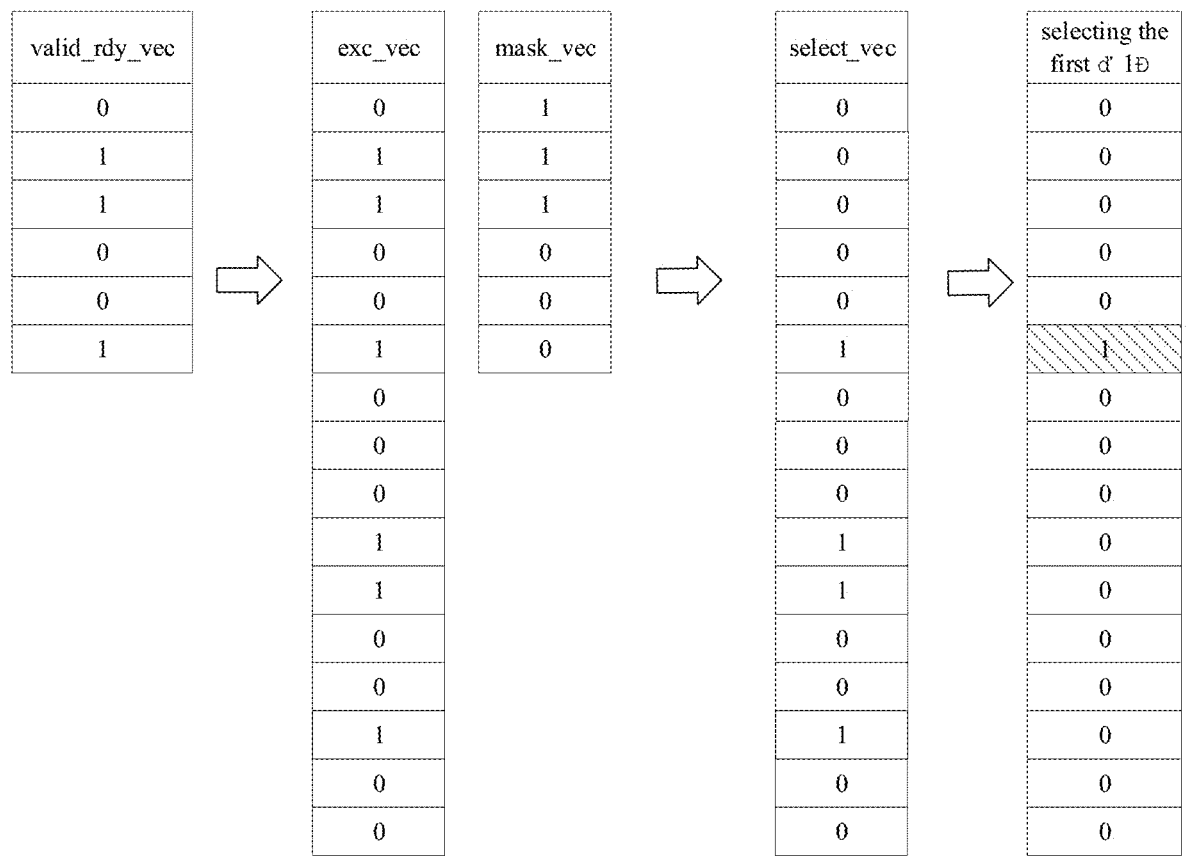
FIG. 18 is a diagram illustrating another queue according to an embodiment of the disclosure.
FIG. 19 is another diagram illustrating a plurality of bit vectors according to an embodiment of the disclosure.

Referring to FIG. 18, for an out-of-order sequence where N=6, M is 16. A tag field is added for each entry in the 6-entries queue, to store a tag value of each entry in the queue. In the embodiment, a tag value of an entry numbered 111 that the instruction A has entered and tag values of entries numbered 011 and 100 that instructions have not entered are 0, the tail ID has been flipped from 111 to 000, tag values of entries numbered 000, 001 and 101 that the instructions B. C. D have respectively entered are changed from 0 to 1. That is, the tag values of entries are {000111}.

Referring to FIG. 19, in the embodiments of the disclosure, a 6-bits mask bit vector "mask_vec" of the queue may be generated based on the tag value of each entry. Specifically, the XOR processing may be performed on the tag values {000111} of entries from the first entry to the last entry and the tag value 0 of the entry with the head ID being 101, to obtain the 6-bits mask_vec.

mask_vec[5:0] =

TAG[5:0] XOR {6'b{TAG[101]}} = {000111} = XOR {000000} = {000111}

Moreover, a 6-bits valid_rdy_vec may be generated based on the value of the valid bit and the value of the ready bit of each entry. The value of each bit in the valid ready bit vector indicates whether each entry of the queue is valid and ready, and the value of each entry of valid_rdy_vec is equal to the value after the AND operation on the corresponding valid bit value and the corresponding ready bit value. Since the instructions A, B, C, D in the queue are all in the valid state, that is, the valid bits of the entries where the instructions are located are all 1, the valid bit vector from the first entry (the 0th entry) to the last entry (the 5th entry) is {100111}. The instruction with the ready bit being 1 indicates that the instruction is ready, that is, the instructions A. C. D are in the ready and executable state, and the ready bit vector from the first entry (the 0th entry) to the last entry (the 5th entry) is {100110} (values of the bits of the bit vector are represented in the order of entry IDs from high to low), the valid ready bit vector is obtained by performing the bitwise AND operation on the valid bit vector and the bit vector as shown in the following equation:

valid_rdy_vec [5:0]=valid [5:0] & rdy [5:0]={100111} & {100110}={100110}.

Further, an M-bits exc_vec of the queue may be generated based on the valid ready bit vector. Since N is 6, which is not the power of 2, and a power of 2 being closest to 6 and greater than 6 is 8, M is twice 8 (i.e., M is 16). Specifically, according to the following equations, the values exc_vec [5:0] from the 0th bit to the 5th bit of the exc_vec are equal to the values {100110} from the 0th bit to the 5th bit of the values exc_vec of the queue, and the values exc_vec [13:8] from the 8th bit to the 15th bit of the exc_vec are equal to the values obtained by duplicating {100110} from the 0th bit to the 5th bit of the valid_rdy_vec of the queue, and since the number of entries 6 is not the power of 2, the remaining bits of the exc_vec are supplemented with 0. That is, the values exc_vec [15:0] from the 0th bit to the 15th bit of the executable bit vector of the queue are {0010011000100110}.

exc_vec[5:0] = valid_rdy_vec[5:0] = {100100} exc_vec[13:8] = {100110} exc_vec[7:6] = {00} exc_vec[15:14] = {00}

That is, exc_vec [15:0]={0010011000100110}

Further, a select_vec with M bits (i.e., 16 bits) of the queue may be generated based on the mask bit vector and the executable bit vector. Specifically, according to the following equations, the values select_vec [5:0] from the 0th bit to the 5th bit of the select_vec are equal to the values obtained by performing the bitwise AND operation on the values exc_vec [5:0] from the 0th bit to the 5th bit of the exc_vec and the values after the bitwise NOT operation on the 6-bits mask_vec from the 0th bit to the 5th bit, and the values select_vec [15:6] from the 6th bit to the 15th bit of the select_vec are equal to the values obtained by duplicating the values exc_vec [15:6] from the 6th bit to the 15th bit. In this way, a 16-bits selection bit vector is obtained.

select_vec[5:0] = exc_vec[5:0] & ~ mask_vec[5:0] =

{100110} & ~ {000111} = {100110} & {111000} = {100000} select_vec[15:6] = exc_vec[15:6] = {0010011000}

That is, select_vec [15:0]={0010011000100000}

Further, referring to a shadow portion in FIG. 19, the first "1" may be selected from the select_vec {0010011000100000} in an order of entry IDs from low to high, and the bit where the first "1" is located is a target bit. A target code 0101 may be obtained by encoding a position of the first "1" in the selection bit vector, and a processed code 101 may be obtained by deleting the value 0 of the 1-bit highest bit in the target code 0101. The processed code 101 is an entry ID number (i.e., an executable entry ID number) where the oldest instruction among the valid and ready instructions selected from the queue is located. That is, an entry corresponding to the entry ID number 101 is an executable entry. Further, the oldest instruction (i.e., the instruction A) in the entry with the entry ID number 101 among the valid and ready instructions is obtained by entry selection for execution.

Figures 20, 21:
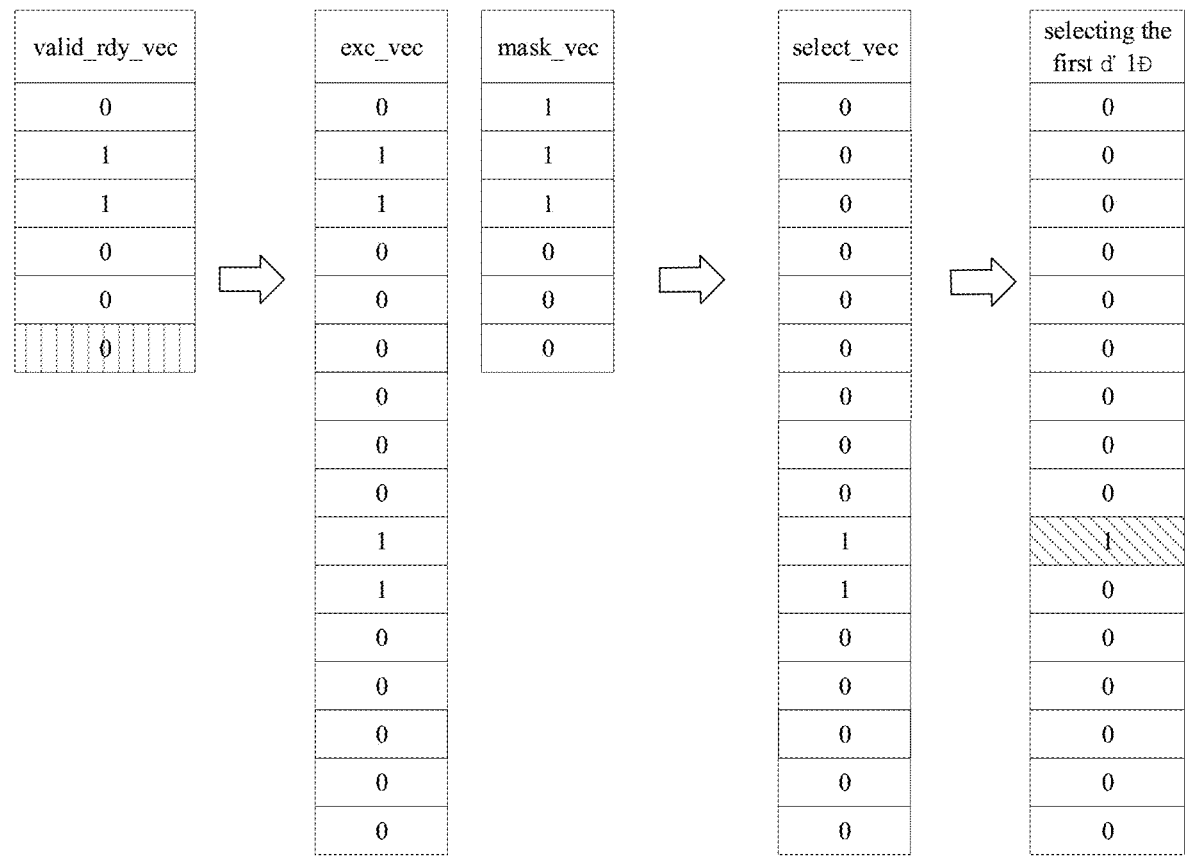
FIG. 20 is another diagram illustrating a plurality of bit vectors according to an embodiment of the disclosure.
FIG. 21 is a diagram illustrating another queue after a plurality of instructions are selected and executed according to an embodiment of the disclosure.

Taking the target number being 2 for example, referring to the shadow portion in FIG. 20, the bit of the instruction that has been selected from the valid_rdy_vec may be set to be invalid. That is, the bit of the valid_rdy_vec corresponding to the entry numbered 101 is set to be invalid (that is, set to 0), so as to obtain an updated valid_rdy_vec, which is equal to {000110}.

Further, referring to FIG. 20, an M-bits executable bit vector of the queue may be generated again based on the updated valid ready bit vector. According to the following equations, the values exc_vec [5:0] from the 0th bit to the 5th bit of the exc_vec are equal to the values {00110} from the 0th bit to the 5th bit of the valid_rdy_vec of the queue, and the values exc_vec [13:8] from the 8th bit to the 13th bit of the exc_vec are equal to the values obtained by duplicating {000110} from the 0th bit to the 5th bit of the valid_rdy_vec of the queue, and since the number of entries 6 is not the power of 2, the remaining bits of the exc_vec are supplemented with 0. That is, the values exc_vec [15:0] from the 0th bit to the 15th bit of the exc_vec of the queue are {0000011000000110}.

exc_vec[5:0] = valid_rdy_vec[5:0] = {000110} exc_vec[13:8] = {000110} exc_vec[7:6] = {00} exc_vec[15:14] = {00}

That is, exc_vec [15:0]={0000011000000110}

Further, a select_vec with M bits (i.e., 16 bits) of the queue may be generated based on the mask bit vector and the executable bit vector. Specifically, according to the following equations, the values select_vec [5:0] from the 0th bit to the 5th bit of the select_vec are equal to the values obtained by performing the bitwise AND operation on the values exc_vec [5:0] from the 0th bit to the 5th bit of the exc_vec and the values after the bitwise NOT operation on the 6-bits mask_vec from the 0th bit to the 5th bit, and the values select_vec [15:6] from the 6th bit to the 15th bit of the exc_vec are equal to the values obtained by duplicating the values exc_vec [15:6] from the 6th bit to the 15th bit of the exc_vec. In this way, the 16-bits selection bit vector is obtained.

$$\text{select\_vec}[5:0] = \text{exc\_vec}[5:0] \:\&\sim \text{mask\_vec}[5:0] =$$

$$\{000110\} \:\&\sim \{000111\} = \{000110\} \:\&\: \{111000\} = \{000000\}$$

$$\text{select\_vec}[15:6] = \text{exc\_vec}[15:6] = \{0000011000\}$$

That is, select_vec [15:0]={0000011000000000}

Further, referring to a shadow portion in FIG. 20, the first "1" may be selected from the select_vec {0000011000000000} in an order of entry IDs from low to high, and the bit where the first "1" is located is a target bit. A target code 1001 may be obtained by encoding a position of the first "1" in the selection bit vector, and a processed code 001 may be obtained by deleting the value 1 of the 1-bit highest bit in the target code 1001. The processed code 001 is an ID number (i.e., an executable entry ID number) of an entry where the oldest instruction among the valid and ready instructions selected from the queue is located. That is, an entry corresponding to the entry ID number 001 is an executable entry. Further, the oldest instruction (i.e., the instruction C) in the entry with the entry ID number 001 among the valid and ready instructions is obtained by entry selection for execution.

In summary, two executable instructions may be selected in parallel, which are the instruction A of the entry with the ID number 101 and the instruction C of the entry with the ID number 001, respectively. After the two executable instructions exit the queue, the head ID may be changed to 000, and valid bit fields of the entries where the instruction A and the instruction C are located are set to 0, thereby obtaining a queue as shown in FIG. 21.

In summary, the executable bit vectors may be generated by adding the tag field to the entry and duplicating the valid ready bit vector of the queue, and the mask bit vector may be generated by performing the XOR processing on the tag value of each entry and the tag value of the head entry, and the selection bit vector of the queue may be generated based on the mask bit vector and the executable bit vector. When the head entry and the tail entry are not on the same "plane" (i.e., the tag value of the entry where the head is located is different from that of the entry where the tail is located), the selection bit vector may be obtained by masking corresponding bits of the executable bit vector from the first entry to a previous entry of the tail entry, so that the target bit with the first corresponding value being the first preset value is selected from the selection bit vector, and the entry ID number where the oldest instruction among the valid and ready instructions is located is obtained based on the target bit. Thus, the parallel selection of the executable entries may be achieved, which reduces the complexity of selection, thereby reducing the delay of selection, effectively enhancing the performance of the out-of-order processor, reducing the power consumption and saving the area.

Corresponding to the methods for selecting the entry of the queue in the out-of-order processor provided in the embodiments of FIG. 2 to FIG. 21, an apparatus for selecting the entry of the queue in the out-of-order processor is further provided in the present disclosure. Since the apparatus for selecting the entry of the queue in the out-of-order processor provided in the embodiments of the present disclosure corresponds to the methods for selecting the entry of the queue in the out-of-order processor provided in the embodiments of FIG. 2 to FIG. 21, the implementations of the methods for selecting the entry of the queue in the out-of-order processor are also applicable to the apparatus for selecting the entry of the queue in the out-of-order processor provided in the embodiments of the present disclosure, which will not be described here.

The apparatus for selecting an entry of a queue in an out-of-order processor according to the embodiments of the disclosure are described referring to attached drawings.

Figure 22:
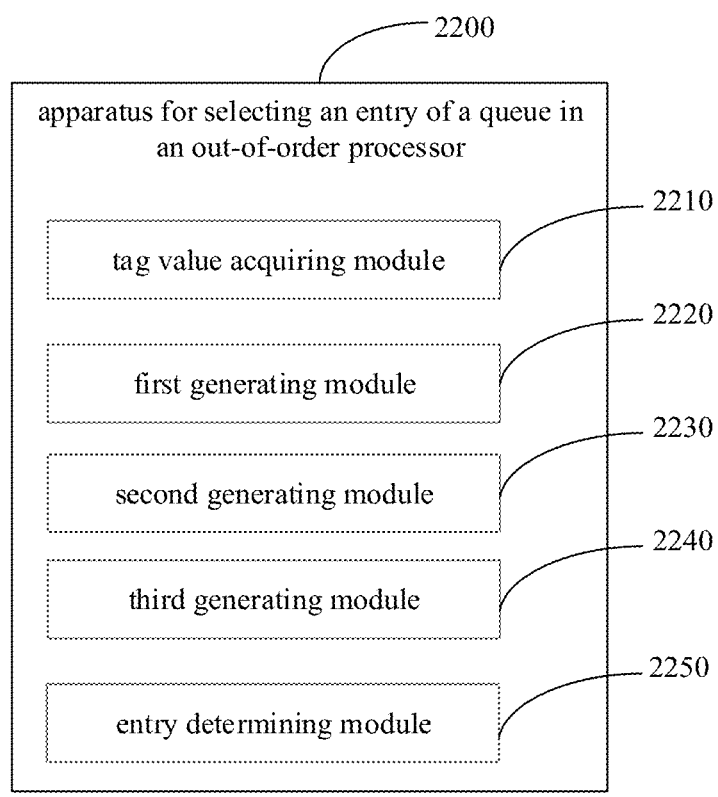
FIG. 22 is a block diagram illustrating a an apparatus for selecting an entry of a queue in an out-of-order processor according to an embodiment of the disclosure.

FIG. 22 is a structural diagram illustrating an apparatus for selecting an entry of a queue in an out-of-order processor according to an embodiment of the disclosure.

As illustrated in FIG. 22, the apparatus 2200 for selecting the entry of the queue in the out-of-order processor includes a tag value acquiring module 2210, a first generating module 2220, a second generating module 2230, a third generating module 2240 and an entry determining module 2250.

The tag value acquiring module 2210 is configured to acquire a tag value of each entry in the queue.

The first generating module 2220 is configured to generate a mask bit vector of the queue based on the tag value of each entry.

The second generating module 2230 is configured to generate an executable bit vector of the queue based on indication information of each entry in the queue. The indication information is configured to indicate whether the entry satisfies an executable condition.

The third generating module 2240 is configured to generate a selection bit vector of the queue based on the mask bit vector and the executable bit vector.

The entry determining module 2250 is configured to determine an entry corresponding to a target bit in the selection bit vector as an executable entry. The target bit is a first bit in the selection bit vector with a corresponding value being a first preset value.

In some embodiments of the disclosure, each entry has a corresponding ID number, and a tail entry in the entries is switched as instructions are written into the queue. In response to the tail entry being switched from a last entry of the queue to a first entry of the queue, an ID number corresponding to the tail entry is flipped.

The tag value of each entry in the queue is determined by:
- in an initialization state, determining the tag value of each entry as a preset first tag value;
- after the instructions are written into the queue, determining a number of flips for the ID number corresponding to the tail entry; and
- determining the tag value of each entry in the queue based on the number of flips.

In some embodiments of the disclosure, determining the tag value of each entry in the queue based on the number of flips includes:
- in response to the number of flips being 0, determining the tag value of each entry in the queue as the preset first tag value;
- in response to the number of flips being an odd number, determining a tag value of a target entry in the queue as a preset second tag value; and
- in response to the number of flips being other even numbers than 0, determining the tag value of the target entry in the queue as the preset first tag value;
- the target entry includes the first entry and each entry between the first entry and the tail entry.

In some embodiments of the disclosure, determining the tag value of each entry in the queue based on the number of flips further includes:

in response to the number of flips being the odd number, determining a tag value of other entry than the target entry in the queue as the preset first tag value; and in response to the number of flips being other even number than 0, determining the tag value of the other entry than the target entry as the preset second tag value.

In some embodiments of the present disclosure, the first generating module 2220 is specifically configured to:

determine a tag value of a head entry in each entry;

obtain a processed tag value of each entry by performing an exclusive-OR (XOR) processing on the tag value of each entry and the tag value of the head entry; and generate the mask bit vector of the queue based on the processed tag value of each entry.

In some embodiments, indication information of each entry includes first indication information for indicating whether an instruction in the entry is valid and second indication information for indicating whether a state of the entry satisfies an execution condition. In response to the first indication information indicating the instruction in the entry is valid and the second indication information indicating the state of the entry satisfies the execution condition, the entry satisfies the executable condition. The first indication information is a value of a valid bit of the entry and the second indication information includes a value of a ready bit of the entry. The second generating module 2230 is specifically configured to:

generate the executable bit vector of the queue based on the value of the valid bit and the value of the ready bit of each entry in the queue.

In some embodiments of the present disclosure, each entry is numbered sequentially with an integer between 0 and N-1, and N is a number of entries in the queue.

The second generating module 2230 is specifically configured to:

obtain a valid ready bit vector with a number of bits being N by performing a bitwise AND operation on the value of the valid bit and the value of the ready bit of each entry; and generate an executable bit vector with a number of bits being M based on the valid ready bit vector;

in response to N being a power of 2, M is twice N: in response to N being not the power of 2, M is twice X. X is a power of 2 greater than N and closest to N.

In some embodiments of the present disclosure, the second generating module 2230 is further configured to:

obtain the executable bit vector by taking values of the bits of the valid ready bit vector as values of a 0th bit to an (N-1)th bit of the executable bit vector and taking values of the bits of the valid ready bit vector as values of an (M/2)th bit to an (M/2+N-1)th bit of the executable bit vector;

in response to the N being not the power of 2, values of other bits of the executable bit vector than the 0th bit to the (N-1)th bit and the (M/2)th bit to the (M/2+N-1)th bit are second preset values.

In some embodiments of the present disclosure, a number of bits of the mask bit vector is N: the third generating module 2240 is specifically configured to:

perform a bitwise NOT operation on the mask bit vector, and perform a bitwise AND operation on values of a 0th bit to an (N-1)th bit after the bitwise NOT operation and values of a 0th bit to an (N-1)th bit of the executable bit vector, and taking values of N bits after the bitwise AND operation as values of a 0th bit to an (N-1)th bit of the selection bit vector;

take values of an Nth bit to an (M-1)th bit of the executable bit vector as values of an Nth bit to an (M-1)th bit of the selection bit vector; and generate the selection bit vector based on the values of the 0th bit to the (N-1)th bit of the selection bit vector and the values of the Nth bit to the (M-1)th bit of the selection bit vector.

In some embodiments of the present disclosure, the entry determining module 2250 is configured to:

obtain a target code by performing a position encoding on the target bit;

obtain a processed code by deleting a value of a highest bit in the target code; and take the processed code as an executable entry ID number, and determine an entry corresponding to the executable entry ID number as the executable entry.

In some embodiments of the disclosure, the apparatus 2200 for selecting the entry of the queue in the out-of-order processor further includes a determining module and a processing module.

The determining module is configured to determine whether a number of executable entries reaches a target number.

The processing module is configured to, in response to determining that the number of executable entries does not reach the target number, determine a bit of the valid ready bit vector corresponding to the executable entry is invalid, and skip to the step of generating the executable bit vector with the number of bits being M based on the valid ready bit vector, until the determined number of executable entries reaches the target number.

According to the apparatus for selecting the entry of the queue in the out-of-order processor in the embodiments of the disclosure, the tag value of each entry in the queue is acquired: the mask bit vector of the queue is generated based on the tag value of each entry: the executable bit vector of the queue is generated based on the indication information of each entry in the queue, in which the indication information is configured to indicate whether the entry satisfies an executable condition: the selection bit vector of the queue is generated based on the mask bit vector and the executable bit vector; and the entry corresponding to the target bit in the selection bit vector is determined as the executable entry, in which the target bit is the first bit in the selection bit vector with the corresponding value being the first preset value. In this way, the apparatus may reduce the selection logic for selecting the executable entry from the queue, reduce the complexity of selection, thereby reducing the delay of selection, effectively enhancing the performance of the out-of-order processor, reducing the power consumption and saving the area.

In order to achieve the above embodiments, an electronic device is further provided in the embodiment of the disclosure. The electronic device includes at least one processor; and a memory communicatively connected to at least one processor. The memory stores instructions executable by at least one processor, and when the instructions are executed by least one processor, the at least one processor may perform the method for selecting the entry of the queue in the out-of-order processor in the above embodiments of the present disclosure.

In order to achieve the above embodiments, a non-transitory computer-readable storage medium storing computer instructions is further provided in the embodiment of the disclosure. The computer instructions are configured to cause a computer to perform the method for selecting the entry of the queue in the out-of-order processor as described in the above embodiments of the disclosure.

In order to achieve the above embodiments, a computer program product is provided in the embodiment of the disclosure. When instructions in the computer program product are executed by a processor, the method for selecting the entry of the queue in the out-of-order processor as described in the above embodiments of the disclosure is implemented.

In order to achieve the above embodiments, a computer program including computer program codes is further provided in the embodiment of the disclosure. When the computer program codes are running on a computer, the computer is caused to perform the method for selecting the entry of the queue in the out-of-order processor as described in the above embodiments of the disclosure.

It needs to be noted that, the foregoing explanation of the method embodiments and the apparatus embodiments for selecting the entry of the queue in the out-of-order processor is also applicable to the electronic device, the storage medium, the computer program product and the computer program, which will not be repeated here.

Figure 23:
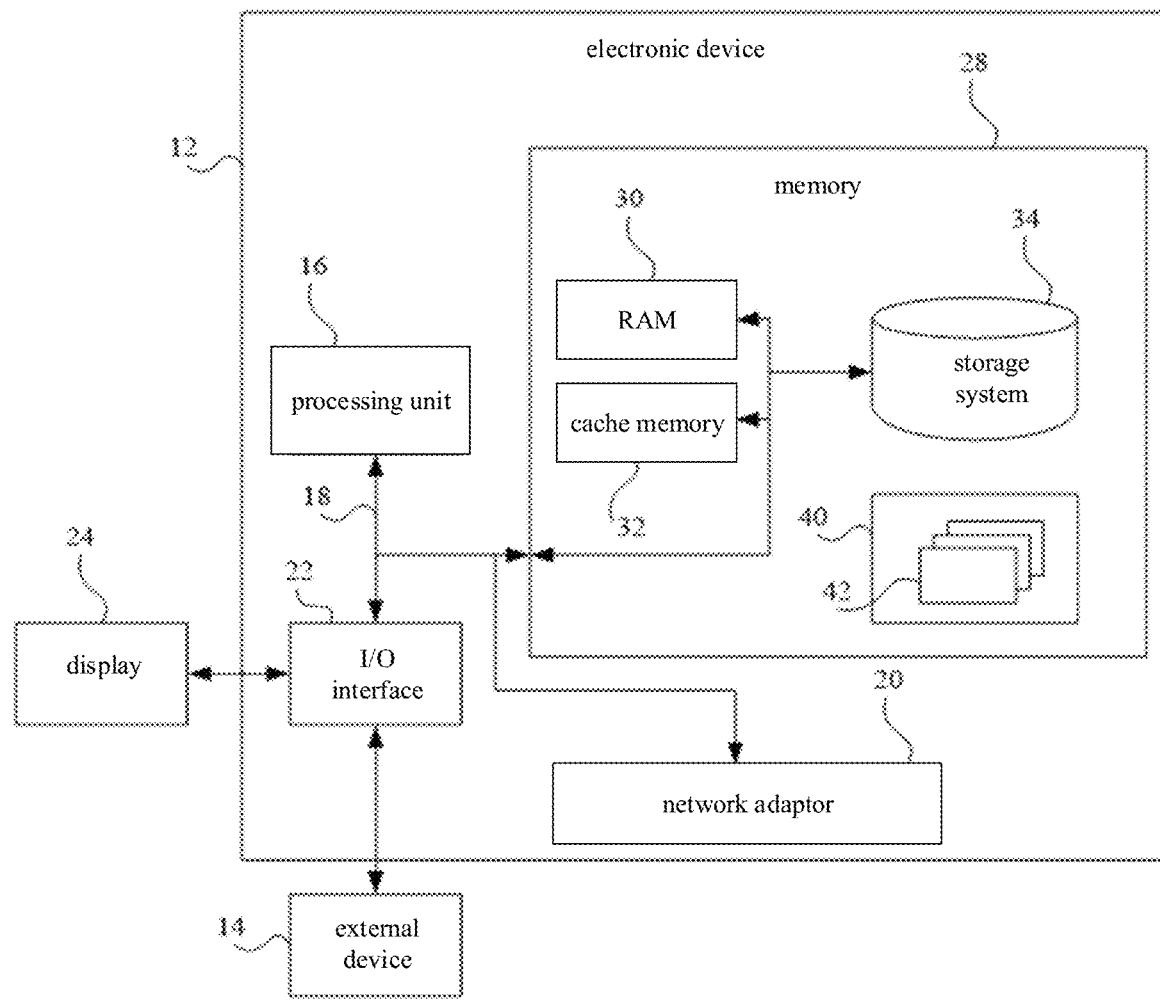
FIG. 23 is a block diagram illustrating an example electronic device configured to implement a method for selecting an entry of a queue in an out-of-order processor in an embodiment of the present disclosure.

FIG. 23 is a block diagram illustrating an example computer device configured to implement the embodiment of the present disclosure. An electronic device 12 illustrated in FIG. 23 is only as an example and should not bring any limitation on the function or application range of the embodiment.

As illustrated in FIG. 23, the electronic device 12 is represented in the form of a general purpose computing device. Components of the electronic device 12 may include but not limited to one or more processors or processing units 16, a memory 28, a bus 18 connected to different system components (including the memory 28 and the processing unit 16).

The bus 18 represents one or more of several types of bus structures, including a memory bus or a memory controller, a peripheral bus, a graphics acceleration port, a processor, or a local bus with any of a plurality of bus structures. For example, the architectures include, but are not limited to, an industry standard architecture (ISA) bus, a micro channel architecture (MAC) bus, an enhanced ISA bus, a video electronics standards association (hereinafter referred to as VESA) local bus and a peripheral component interconnection (PCI) bus.

The electronic device 12 includes a variety of computer system readable media. The media may be any available media that may be accessed by the electronic device 12, including volatile and non-volatile media, and removable and non-removable media.

The memory 28 may include a computer system readable medium in the form of a volatile memory, for example, a random access memory (RAM) 30 and/or a cache memory 32. The electronic device 12 may further include other volatile and non-volatile media, and removable and non-removable media. As an example only, a storage system 34 may be configured to read and write a non-removable and non-volatile magnetic medium (not shown in FIG. 23, commonly referred to as a "hard disk drive").

Although not shown in FIG. 23, a disk drive for reading and writing a removable non-volatile magnetic disk (for example, a "floppy disk"), and an optical disk drive for reading and writing a removable non-volatile optical disk (such as a compact disc read only memory (CD-ROM)) and a digital video disc read only memory (DVD-ROM)) or other optical media) may be provided. In these cases, each driver may be connected to the bus 18 through one or more data media interfaces. The memory 28 may include at least one program product having a set of (for example, at least one) program modules configured to perform the functions of the embodiments of the present disclosure.

A program/utility 40 having a set of (at least one) program modules 42 may be stored, for example, may be stored in the memory 28. The program modules 42 include but not limited to, an operating system, one or more applications, other program modules and program data, and each of these examples or a certain combination of these examples may include implementations of a network environment. The program modules 42 generally perform the functions and/or methods in the embodiments described herein.

The electronic device 12 may also communicate with one or more external devices 14 (for example, a keyboard, a pointing device, a display 24), and may communicate with one or more devices that enable a user to interact with the electronic device 12, and/or any device (for example, a network card, a modem, etc.) that enables the electronic device 12 to communicate with one or more other computing devices. The communication may be performed by an input/output (I/O) interface 22. And, the electronic device 12 may further communicate with one or more networks (such as a local area network (LAN), a wide area network (WAN), and/or a public network, such as Internet) through a network adapter 20. As shown in FIG. 23, the network adapter 20 communicates with other modules of the electronic device 12 via the bus 18. It should be understood that although not shown in the figures, other hardware and/or software modules may be used in combination with the electronic device 12, including but not limited to: a microcode, a device driver, a redundant processing unit, an external disk drive array, a RAID system, a tape drive and a data backup storage system.

The processing unit 16 executes various function applications and data processing by running a program stored in the memory 28, for example, implements the method for selecting the item of the queue in the out-of-order processor as mentioned in the foregoing embodiments.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope of the present disclosure are given by the appended claims.

It should be understood that the present disclosure is not limited to the precise structure described above and shown in the drawings, and various modifications and changes may be made without departing from its scope. The scope of the present disclosure is only limited by the appended claims. The scope of the present disclosure is only limited by the appended claims.

It needs to be noted that, in the description of the disclosure, these terms such as "first" and "second" used in the descriptions of the disclosure are only for a description purpose, but cannot be understood as relative importance of indication or implication. In addition, in the description of the present disclosure, "a plurality of" means two or more than two, unless otherwise noted.

Any process or method descriptions described in the flowchart or in other ways herein may be understood as a module, a segment or a part of codes including one or more executable instructions configured to implement steps of specific logical functions or processes, and the scopes of embodiments of the present disclosure include additional implementations that are not be in the above shown or discussed order, including implementations that the functions are performed in the substantially simultaneous manner according to the involved functions or in reverse order, which should be understood by those skilled in the art of embodiments of the present disclosure.

It should be understood that each part of the disclosure may be realized by the hardware, software, firmware or their combination. In the above implementation, multiple steps or methods may be stored in a memory and implemented by a software or a firmware which is executed by a suitable instruction execution system. For example, if implemented in hardware, they may be implemented by any of the following techniques or their combination known in the art as in another implementation: a discrete logic circuit with logic gate circuits configured to achieve logic functions on data signals, a special integrated circuit with appropriate combined logic gate circuits, a programmable gate array (PGA), a field programmable gate array (FPGA), etc., It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual function units in the embodiments of the disclosure may be integrated in one processing module or may be separately physically present, or two or more units may be integrated in one module. The integrated module as described above may be achieved in the form of hardware, or may be achieved in the form of a software functional module. The integrated module may be stored in a computer readable storage medium if it is implemented in the form of a software functional module and sold and used as an independent product. The storage medium mentioned above may be ROMs, magnetic disks or CDs, etc., In the descriptions of the specification, descriptions with reference to terms "one embodiment", "some embodiments", "examples", "specific examples" or "some examples" etc. mean specific features, structures, materials or characteristics described in conjunction with the embodiments or examples are included in at least one embodiment or example of the present disclosure. In this specification, the representations of the above terms do not have to be a same embodiment or example. Moreover, specific features, structures, materials or characteristics described may be combined in any one or more embodiments or examples in a suitable manner. Although the explanatory embodiments have been shown and described, it would be appreciated by those skilled in the art that the above embodiments cannot be construed to limit the disclosure, and changes, alternatives, and modifications can be made in the embodiments without departing from scope of the disclosure.

All embodiments of the disclosure may be executed separately or in combination with other embodiments, and are deemed within a protection scope of the disclosure.

What is claimed is:

1. A method for selecting an entry of a queue in an out-of-order processor, comprising:
   acquiring a tag value of each entry in the queue;
   generating a mask bit vector of the queue based on the tag value of each entry;
   generating an executable bit vector of the queue based on indication information of each entry in the queue, wherein the indication information is configured to indicate whether a corresponding entry satisfies an executable condition;
   generating a selection bit vector of the queue based on the mask bit vector and the executable bit vector; and
   determining an entry corresponding to a target bit in the selection bit vector as an executable entry, wherein the target bit is a first bit in the selection bit vector, and a value of the first bit is equal to a first preset value.

2. The method according to claim 1, wherein each entry has a corresponding ID number, and a tail entry comprised in the entries of the queue is switched as instructions are written into the queue, wherein in response to the tail entry switching from a last entry of the queue to a first entry of the queue, an ID number corresponding to the tail entry is flipped;
   wherein the method further comprises:
      in an initialization state, determining the tag value of each entry as a preset first tag value;
      after the instructions are written into the queue, determining a number of flips for the ID number corresponding to the tail entry; and
      determining the tag value of each entry in the queue based on the number of flips.

3. The method according to claim 2, wherein determining the tag value of each entry in the queue based on the number of flips comprises:
   in response to the number of flips being 0, determining the tag value of each entry in the queue as the preset first tag value;
   in response to the number of flips being an odd number, determining a tag value of a target entry in the queue as a preset second tag value; and
   in response to the number of flips being other even numbers than 0, determining the tag value of the target entry in the queue as the preset first tag value;
   wherein the target entry comprises the first entry and each entry between the first entry and the tail entry.

4. The method according to claim 3, wherein determining the tag value of each entry in the queue based on the number of flips further comprises:
   in response to the number of flips being the odd number, determining a tag value of other entry than the target entry in the queue as the preset first tag value; and
   in response to the number of flips being other even number than 0, determining the tag value of the other entry than the target entry as the preset second tag value.

5. The method according to claim 1, wherein generating the mask bit vector of the queue based on the tag value of each entry comprises:
   determining a tag value of a head entry comprised in the entries of the queue;
   obtaining a processed tag value of each entry by performing an exclusive-OR (XOR) processing on the tag value of each entry and the tag value of the head entry; and
   generating the mask bit vector of the queue based on the processed tag value of each entry.

6. The method according to claim 1, wherein indication information of each entry comprises first indication information for indicating whether an instruction in the corresponding entry is valid and second indication information for indicating whether a state of the corresponding entry satisfies an execution condition, and
- in response to the first indication information indicating the instruction in the corresponding entry is valid and the second indication information indicating the state of the corresponding entry satisfies the execution condition, the corresponding entry satisfies the executable condition,
- wherein the first indication information is a value of a valid bit of the corresponding entry and the second indication information comprises a value of a ready bit of the corresponding entry;
- generating the executable bit vector of the queue based on the indication information of each entry in the queue comprises:
  - generating the executable bit vector of the queue based on the value of the valid bit and the value of the ready bit of each entry in the queue.

7. The method according to claim 6, wherein each entry is numbered sequentially with an integer between 0 and N-1, and N is a number of entries in the queue;
- generating the executable bit vector of the queue based on the value of the valid bit and the value of the ready bit of each entry in the queue comprises:
  - obtaining a valid ready bit vector with N bits a number of bits being N by performing a bitwise AND operation on the value of the valid bit and the value of the ready bit of each entry; and
  - generating an executable bit vector with M bits a number of bits being M based on the valid ready bit vector;
- wherein in response to N being a power of 2, M is twice N; in response to N being not the power of 2, M is twice X, wherein X is a power of 2 greater than N and closest to N.

8. The method according to claim 7, wherein generating the executable bit vector with the number of bits being M based on the valid ready bit vector comprises:
- obtaining the executable bit vector by taking values of the N bits of the valid ready bit vector as values of a $0^{th}$ bit to an (N-1)th bit of the executable bit vector and taking values of the N bits of the valid ready bit vector as values of an (M/2)th bit to an (M/2+N-1)th bit of the executable bit vector;
- wherein in response to the N being not the power of 2, values of other bits of the executable bit vector than the $0^{th}$ bit to the (N-1)th bit and the (M/2)th bit to the (M/2+N-1)th bit are equal to second preset values.

9. The method according to claim 1, wherein a number of bits of the mask bit vector is N; and generating the selection bit vector of the queue based on the mask bit vector and the executable bit vector comprises:
- performing a bitwise NOT operation on values of a $0^{th}$ bit to an (N-1)th bit of the mask bit vector, performing a bitwise AND operation on values of the $0^{th}$ bit to the (N-1)th bit after the bitwise NOT operation and values of a $0^{th}$ bit to an (N-1)th bit of the executable bit vector, and taking values of N bits after the bitwise AND operation as values of a $0^{th}$ bit to an (N-1)th bit of the selection bit vector;
- taking values of an Nth bit to an (M-1)th bit of the executable bit vector as values of an Nth bit to an (M-1)th bit of the selection bit vector; and
- generating the selection bit vector based on the values of the $0^{th}$ bit to the (N-1)th bit of the selection bit vector and the values of the Nth bit to the (M-1)th bit of the selection bit vector.

10. The method according to claim 1, wherein determining the entry corresponding to the target bit in the selection bit vector as the executable entry comprises:
- obtaining a target code by performing a position encoding on the target bit;
- obtaining a processed code by deleting a value of a highest bit in the target code; and
- taking the processed code as an executable entry ID number, and determining an entry corresponding to the executable entry ID number as the executable entry.

11. The method according to claim 7, wherein after determining the entry corresponding to the target bit in the selection bit vector as the executable entry, the method further comprises:
- determining whether a number of executable entries reaches a target number; and
- in response to determining that the number of executable entries does not reach the target number, determining a bit of the valid ready bit vector corresponding to the executable entry is invalid, and skipping to the step of generating the executable bit vector with the number of bits being M based on the valid ready bit vector, until the determined number of executable entries reaches the target number.

12. An electronic device, comprising:
- at least one processor; and
- a memory communicatively connected to the at least one processor and stored with instructions executable by the at least one processor,
- wherein the at least one processor is configured to:
  - acquire a tag value of each entry in a queue;
  - generate a mask bit vector of the queue based on the tag value of each entry;
  - generate an executable bit vector of the queue based on indication information of each entry in the queue, wherein the indication information is configured to indicate whether a corresponding entry satisfies an executable condition;
  - generate a selection bit vector of the queue based on the mask bit vector and the executable bit vector; and
  - determine an entry corresponding to a target bit in the selection bit vector as an executable entry, wherein the target bit is a first bit in the selection bit vector, and a value of the first bit is equal to a first preset value.

13. A non-transitory computer-readable storage medium having computer instructions stored thereon, wherein the computer instructions are configured to cause a computer to perform a method for selecting an entry of a queue in an out-of-order processor, the method comprising:
- acquiring a tag value of each entry in the queue;
- generating a mask bit vector of the queue based on the tag value of each entry;
- generating an executable bit vector of the queue based on indication information of each entry in the queue, wherein the indication information is configured to indicate whether a corresponding entry satisfies an executable condition;
- generating a selection bit vector of the queue based on the mask bit vector and the executable bit vector; and
- determining an entry corresponding to a target bit in the selection bit vector as an executable entry, wherein the target bit is a first bit in the selection bit vector, and a value of the first bit is equal to a first preset value.

14. The electronic device according to claim 13, wherein each entry has a corresponding ID number, and a tail entry comprised in the entries of the queue is switched as instructions are written into the queue, wherein in response to the tail entry switching from a last entry of the queue to a first entry of the queue, an ID number corresponding to the tail entry is flipped, wherein the at least one processor is further configured to:
   in an initialization state, determine the tag value of each entry as a preset first tag value;
   after the instructions are written into the queue, determine a number of flips for the ID number corresponding to the tail entry; and
   determine the tag value of each entry in the queue based on the number of flips.

15. The electronic device according to claim 14, wherein the at least one processor is further configured to:
   in response to the number of flips being 0, determine the tag value of each entry in the queue as the preset first tag value;
   in response to the number of flips being an odd number, determine a tag value of a target entry in the queue as a preset second tag value; and
   in response to the number of flips being other even numbers than 0, determine the tag value of the target entry in the queue as the preset first tag value;
   wherein the target entry comprises the first entry and each entry between the first entry and the tail entry.

16. The electronic device according to claim 15, wherein the at least one processor is further configured to:
   in response to the number of flips being the odd number, determine a tag value of other entry than the target entry in the queue as the preset first tag value; and
   in response to the number of flips being other even number than 0, determine the tag value of the other entry than the target entry as the preset second tag value.

17. The electronic device according to claim 12, wherein the at least one processor is further configured to:
   determine a tag value of a head entry comprised in the entries of the queue;
   obtain a processed tag value of each entry by performing an exclusive-OR (XOR) processing on the tag value of each entry and the tag value of the head entry; and
   generate the mask bit vector of the queue based on the processed tag value of each entry.

18. The electronic device according to claim 12, wherein indication information of each entry comprises first indication information for indicating whether an instruction in the corresponding entry is valid and second indication information for indicating whether a state of the corresponding entry satisfies an execution condition, and
   in response to the first indication information indicating the instruction in the corresponding entry is valid and the second indication information indicating the state of the corresponding entry satisfies the execution condition, the corresponding entry satisfies the executable condition,
   wherein the first indication information is a value of a valid bit of the corresponding entry and the second indication information comprises a value of a ready bit of the corresponding entry;
   wherein the at least one processor is further configured to:
      generate the executable bit vector of the queue based on the value of the valid bit and the value of the ready bit of each entry in the queue.

19. The electronic device according to claim 18, wherein each entry is numbered sequentially with an integer between 0 and N-1, and N is a number of entries in the queue, wherein the at least one processor is further configured to:
   obtain a valid ready bit vector with N bits by performing a bitwise AND operation on the value of the valid bit and the value of the ready bit of each entry; and
   generate an executable bit vector with M bits being based on the valid ready bit vector;
   wherein in response to N being a power of 2, M is twice N; in response to N being not the power of 2, M is twice X, wherein X is a power of 2 greater than N and closest to N.

20. The electronic device according to claim 19, wherein the at least one processor is further configured to:
   obtain the executable bit vector by taking values of the N bits of the valid ready bit vector as values of a $0^{th}$ bit to an (N-1)th bit of the executable bit vector and taking values of the N bits of the valid ready bit vector as values of an (M/2)th bit to an (M/2+N-1)th bit of the executable bit vector;
   wherein in response to the N being not the power of 2, values of other bits of the executable bit vector than the $0^{th}$ bit to the (N-1)th bit and the (M/2)th bit to the (M/2+N-1)th bit are equal to second preset values.

* * * * *